(12) United States Patent
Surti et al.

(10) Patent No.: US 10,037,621 B2
(45) Date of Patent: Jul. 31, 2018

(54) HIERARCHICAL QUADRANT BASED COVERAGE TESTING FOR RASTERIZATION

(71) Applicants: Prasoonkumar Surti, Folsom, CA (US); Thomas Piazza, Granite Bay, CA (US); Abhishek R. Appu, El Dorado Hills, CA (US)

(72) Inventors: Prasoonkumar Surti, Folsom, CA (US); Thomas Piazza, Granite Bay, CA (US); Abhishek R. Appu, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 62 days.

(21) Appl. No.: 14/743,665

(22) Filed: Jun. 18, 2015

(65) Prior Publication Data
US 2016/0371879 A1 Dec. 22, 2016

(51) Int. Cl.
*G09G 5/00* (2006.01)
*G06T 15/00* (2011.01)
*G06T 11/40* (2006.01)
*G06T 7/13* (2017.01)

(52) U.S. Cl.
CPC .............. *G06T 15/005* (2013.01); *G06T 7/13* (2017.01); *G06T 11/40* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 5,008,838 A | 4/1991 | Kelleher et al. | |
| 6,072,505 A | 6/2000 | Piazza et al. | |
| 6,518,974 B2 | 2/2003 | Taylor | |
| 7,301,537 B2 | 11/2007 | Strom et al. | |
| 7,804,499 B1 * | 9/2010 | Molnar | G06T 15/005 345/422 |
| 8,477,134 B1 * | 7/2013 | Vignon | G06T 15/40 345/421 |
| 9,607,390 B2 * | 3/2017 | Heggelund | G06T 7/62 |
| 2002/0093520 A1 * | 7/2002 | Larson | G06T 11/40 345/694 |

(Continued)

OTHER PUBLICATIONS

PCT/US2016/031874, "Notification of Transmittal of the International Search Report and the Written Opinion of the International Searching Authority, or the Declaration" dated Sep. 6, 2016, pp. 13.
Juan Pineda, "A Parallel Algorithm for Polygon Rasterization", Computer Graphics, vol. 22, No. 4, Aug. 1988, © ACM-0-89791-275-6/88/008/0017, 4 pages.

(Continued)

*Primary Examiner* — M Good Johnson
(74) *Attorney, Agent, or Firm* — Womble Bond Dickinson (US) LLP

(57) ABSTRACT

In embodiments described herein, graphics hardware is described to reduce the number of wasted clock cycles expended during rasterization and performs coverage test iteration in a cache coherent manner. An exemplary embodiment comprises block selection logic to select an initial block of pixels associated with edges of a primitive and edge determination logic to analyze the initial block of pixels to determine a set of fully covered quadrants of the initial block of pixels and analyze a block of pixels adjacent to the initial block of pixels to determine whether the block of adjacent pixels is void.

25 Claims, 22 Drawing Sheets

(56) References Cited

U.S. PATENT DOCUMENTS

| | | | |
|---|---|---|---|
| 2006/0044317 A1 | 3/2006 | Bourd et al. | |
| 2008/0158252 A1 | 7/2008 | Iourcha et al. | |
| 2009/0027416 A1* | 1/2009 | Barone | G06T 11/001 345/611 |
| 2011/0234609 A1 | 9/2011 | Cai et al. | |
| 2013/0021358 A1* | 1/2013 | Nordlund | G06T 11/40 345/581 |
| 2013/0342547 A1* | 12/2013 | Lum | G06T 15/005 345/505 |
| 2014/0098084 A1* | 4/2014 | Subag | G06T 11/40 345/419 |
| 2015/0022525 A1 | 1/2015 | Grenfell | |
| 2015/0097857 A1 | 4/2015 | Akenine-Moller et al. | |

OTHER PUBLICATIONS

Joel McCormack et al., "Tiled Poygon Traversal Using Half-Plane Edge Functions", Compaq Computer Corporation, HWWS 2000, Interlaken, Switzerland, © ACM 2000 1-58113-257-3/00/08, 7 pages.

Ned Greene, "Hierarchical Polygon Tiling with Coverage Masks", Apple Computer, 1 Infinite Loop, Cupertino, CA 95014, 12 pages.

Tomas Akenine-Moller, "Some Notes on Graphics Hardware", Originally a draft for EDA075 Mobile Computer Graphics, and later used for EDAN 35 High-Performance Computer Graphics, © Draft Date Nov. 27, 2012, 95 pages.

Brian Kelleher, "Pixel Vision Architecture", Digital Equipment Corporation, Workstation Systems Engineering, Palo Alto, California, Revision 4.0, Oct. 23, 1992, 123 Pages.

* cited by examiner

GRAPHICS PROCESSOR COMMAND FORMAT
900

HIERARCHICAL QUADRANT BASED COVERAGE TESTING FOR RASTERIZATION

TECHNICAL FIELD

Embodiments generally relate to graphics processing hardware. More particularly, embodiments relate to graphics processing hardware to perform rasterization.

BACKGROUND

Rasterization is a process by which a scene of three-dimensional (3D) polygons is rendered onto a two-dimensional (2D) surface. The rasterization process can be performed in several stages, including a transformation stage, a clipping stage, and a scan conversion stage. The transformation stage converts 3D polygon vertices to vertices on a 2D plane. Once the vertices are transformed to 2D locations, some of vertices may lie may be outside of the viewing window for the scene. The set of vertices may be clipped, such that only vertices within the scene receive further processing.

Once the 3D polygons are transformed to a 2D location and clipped into a viewing window, a scan conversion process is performed to determine which pixels are used to draw the image. Triangles are generally used as the basic primitive for rasterization and graphics rendering hardware can decompose complex polygons into component triangles. The component triangles can be used to perform coverage testing during the scan conversion process. Coverage testing is performed to determine is a given pixel is covered a triangle. If a pixel is to be rendered, the pixel should be at least partially covered by a triangle and not blocked by another pixel. Graphics processor hardware can include dedicated logic to perform coverage testing to determine whether a given pixel of a render target is to be rendered.

During scan conversion, a triangle can produce a fragment for every pixel sample that is within the 2D area of the triangle. A square block of samples can be analyzed determined if a pixel is covered by the triangle. The result of scan converting a triangle is a sequence of fragments that cover the shape of the triangle. Graphics hardware logic can implement an iterator or walker to cover all the candidate blocks to find the covered sample-blocks. Such iterator may consume more than 1 clock cycle per sample-block. Depending on walking algorithm, graphics processor clock cycles may be spent walking sample-blocks that later portions of the graphics rasterization pipeline determines to not be covered by the triangle. The clock cycles spent walking uncovered sample blocks are generally considered wasted, as those cycles are not spent creating useful work for downstream elements of the processor pipeline.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

In embodiments described herein, graphics hardware is described which reduces the number of wasted clock cycles expended during rasterization. Previous implementation relied on top angle bisector to drop down to the row of sample-blocks. The top angle bisector implementation may cause the triangle walk to jumping from the end of a row to a location in the middle of the next row. Jumping from the end of a row to a location in the middle of the next row can result in cache locality issues, resulting in a sample, Z and Color cache miss. In one embodiment, a process is described in which graphics iterator hardware walks the edge of each triangle in a snake-like fashion, such that next block on the down row is in the vicinity of the previous block.

In a further embodiment, coarse level iterator hardware iterates over square regions of screen space to determine which groups of samples may be covered. After the coarse level iteration, a finder level of coverage testing may be performed to determine whether a specific pixel in a sample region is covered. To implement the finer level of coverage testing, dedicated graphics hardware can use edge functions to determine if a pixel or part of a pixel is inside or outside of the triangle. Logic is described herein which performs an optimize process for determining if sample quadrants within a square region of pixels are completely covered or completely uncovered. Determining if sample quadrants are completely covered or uncovered reduces the computational burden of determining pixel level coverage in downstream elements of the rasterization pipeline by avoiding pixel level coverage testing for completely covered and uncovered sample quadrants.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, similar techniques and teachings may be applied to other types of circuits or semiconductor devices.

In the description that follows, FIGS. 1-12 provide an overview of exemplary data processing system and graphics processor logic that incorporates or relates to the various embodiments. FIGS. 13-16 provide specific details of the various embodiments.

System Overview

Figure 1:
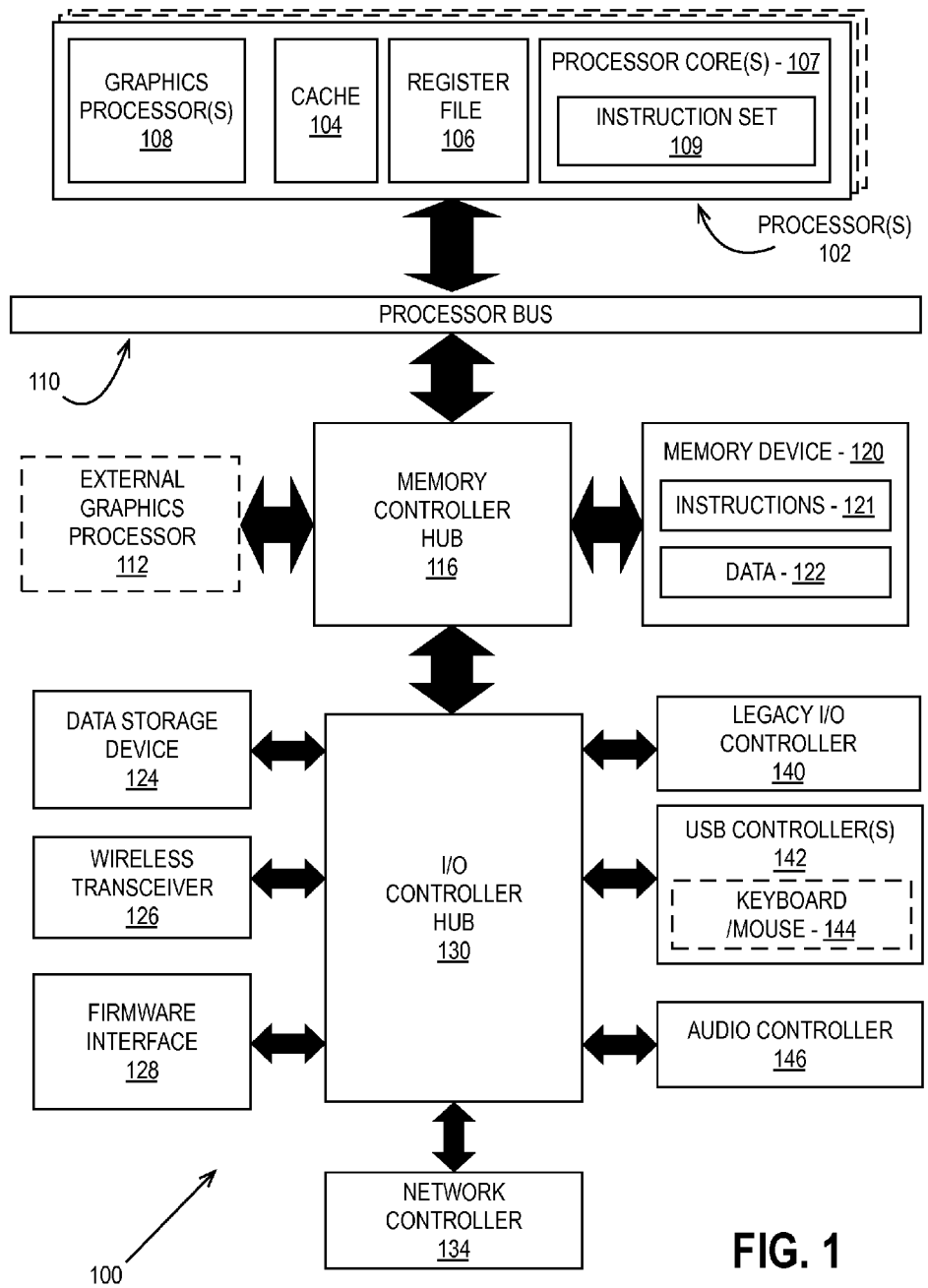
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
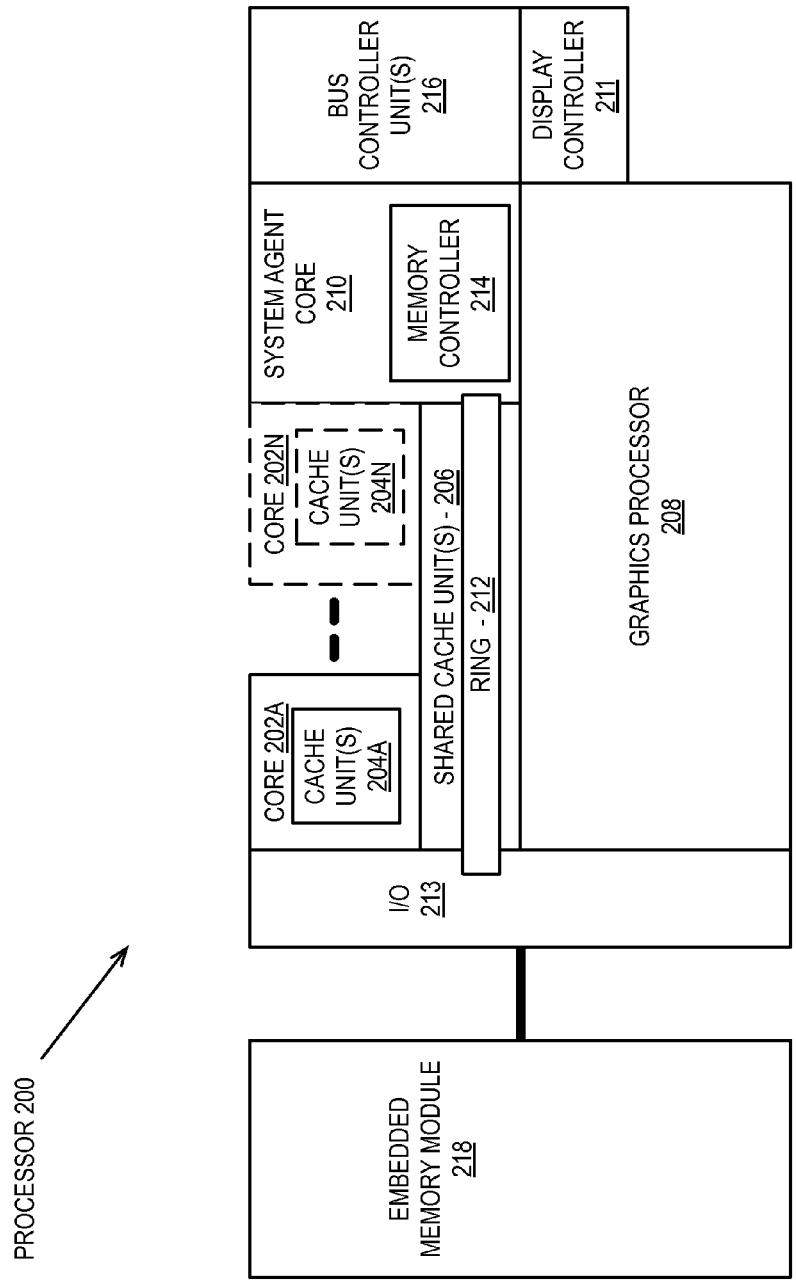
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
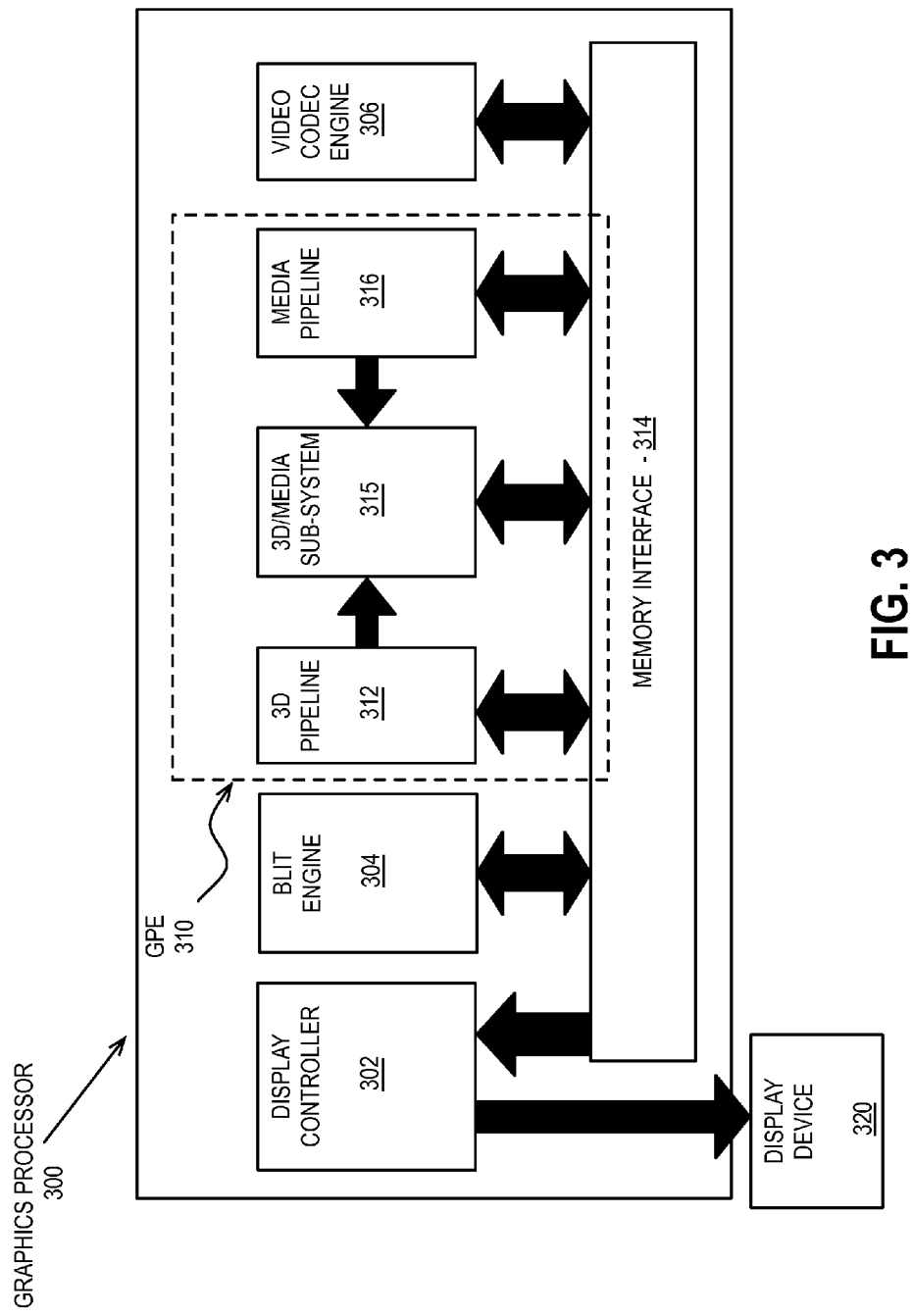
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
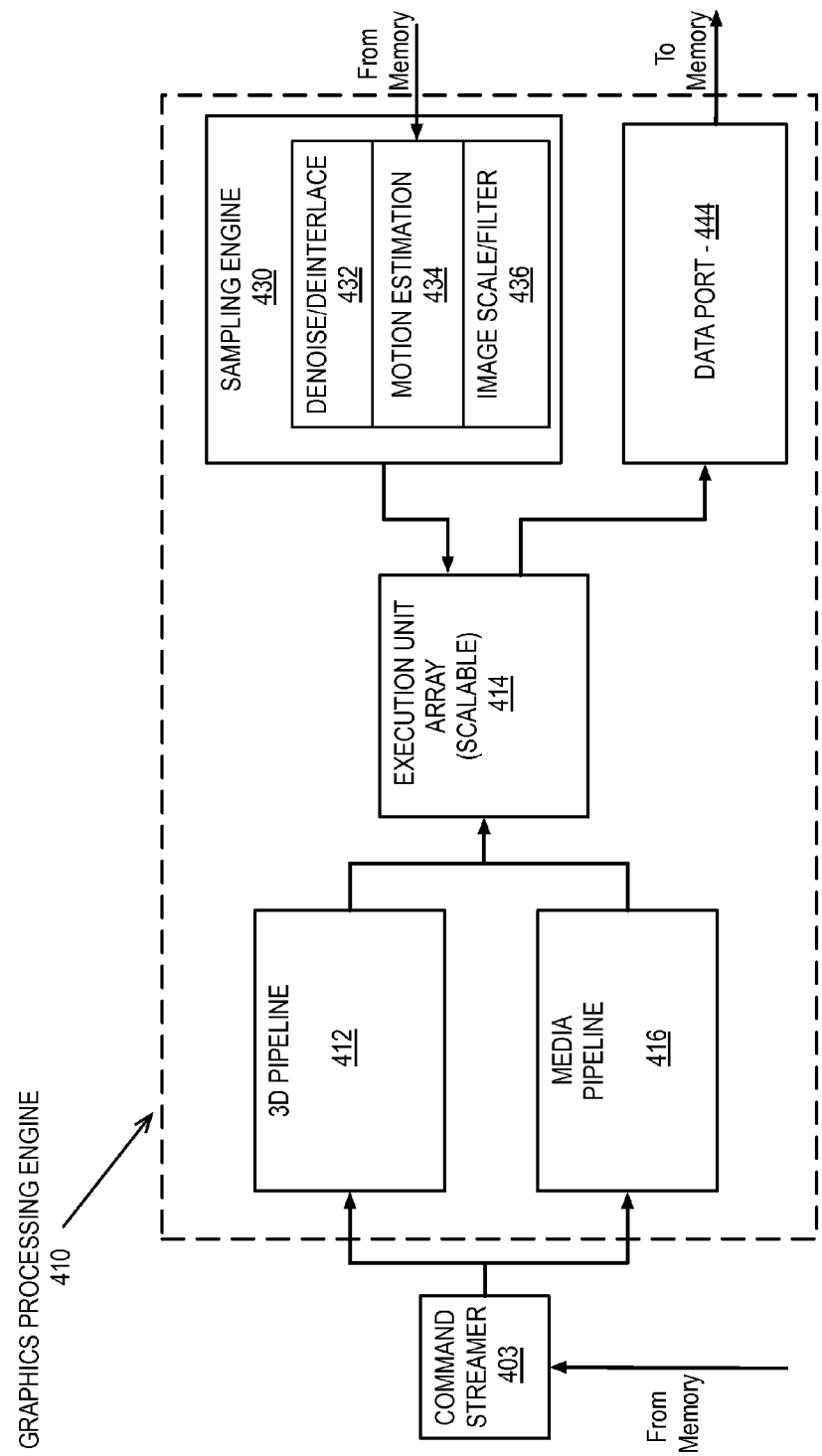
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
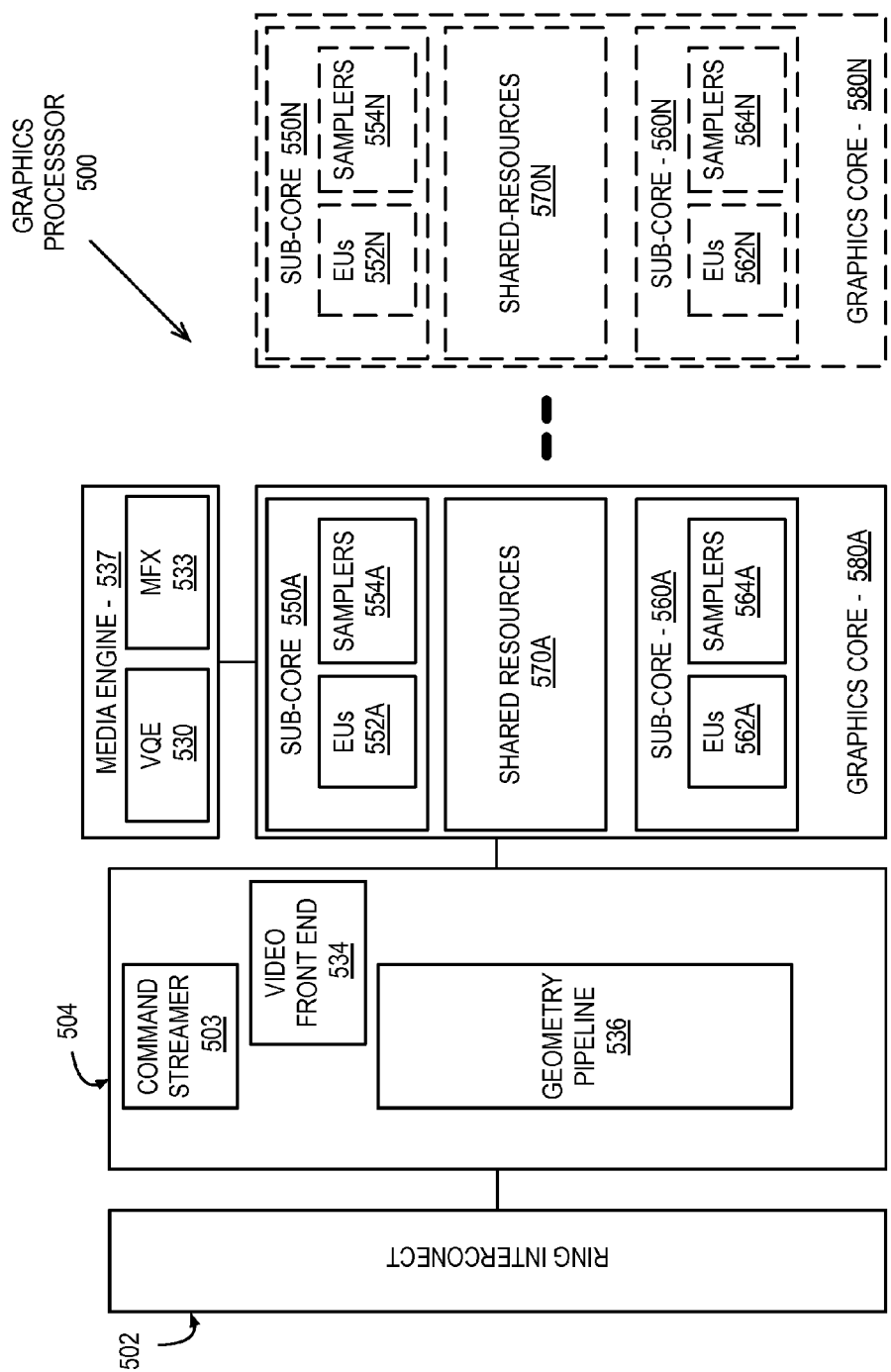
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
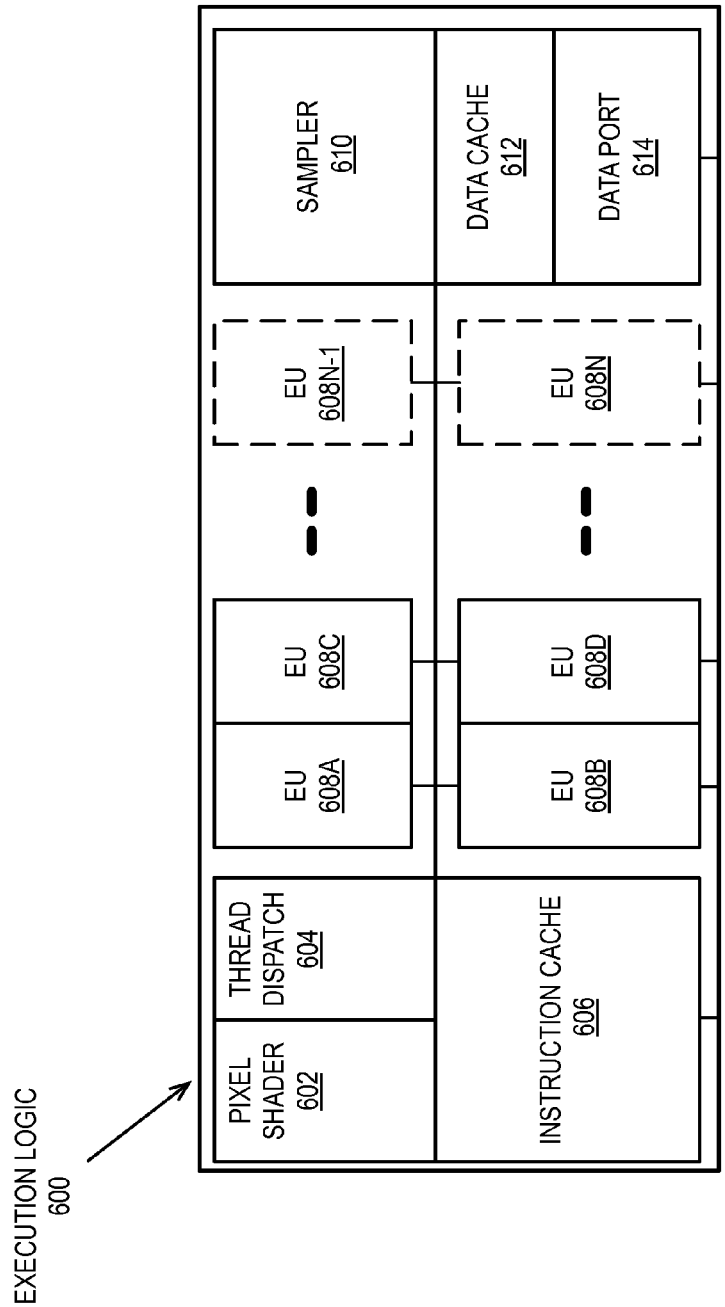
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
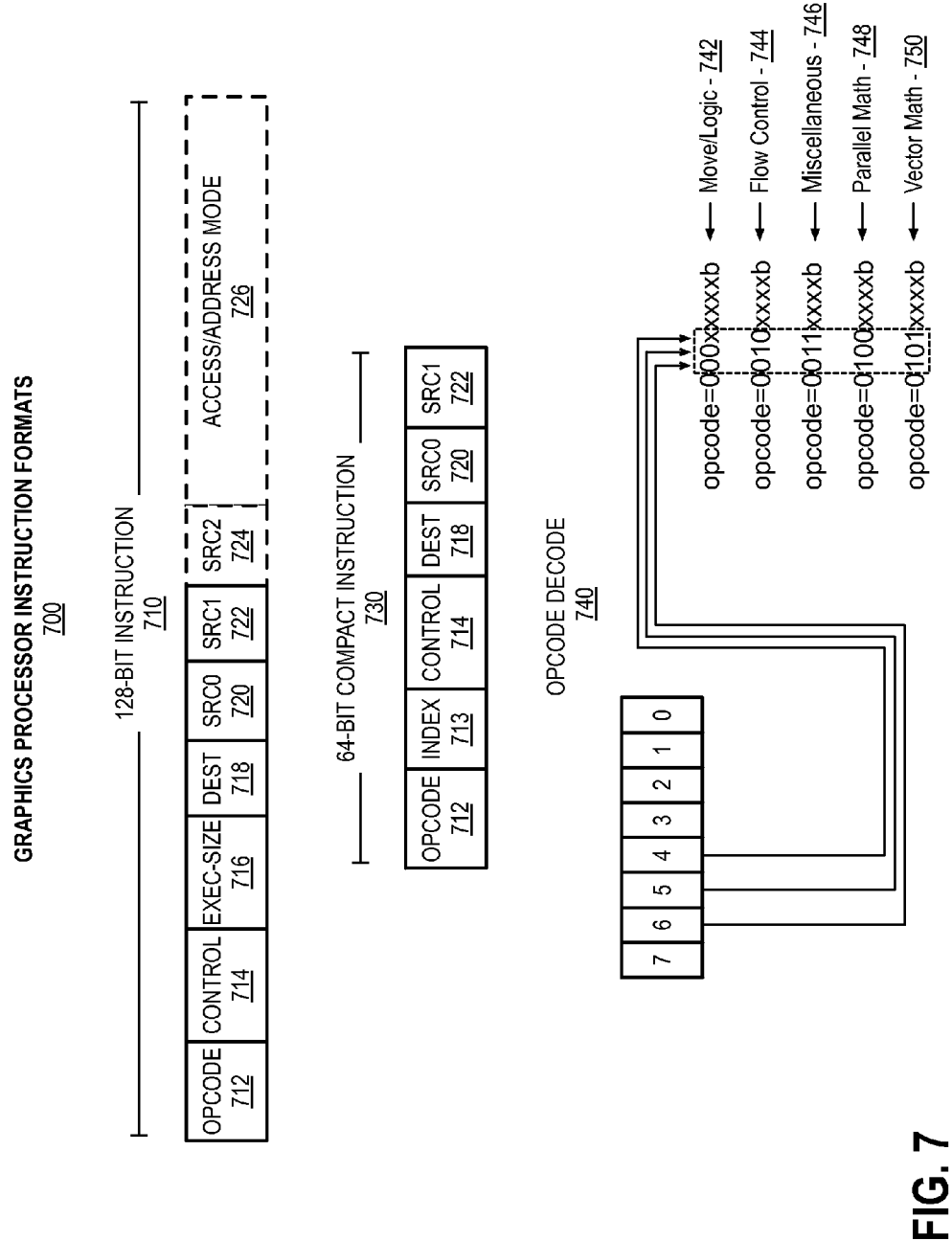
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
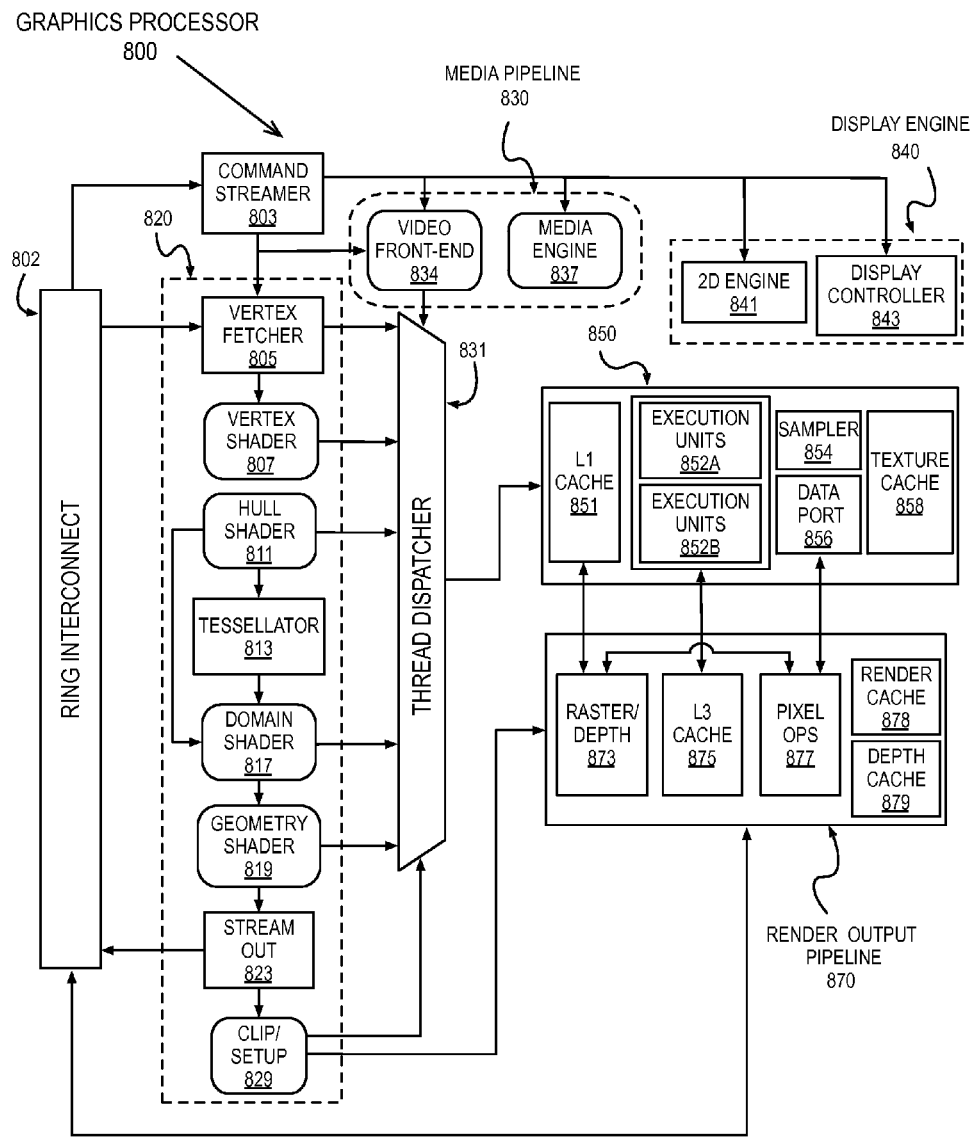
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
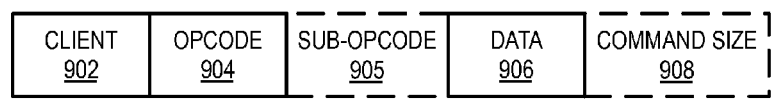
FIG. 9A is a block diagram illustrating a graphics processor command format according to an embodiment.
Figure 9B:
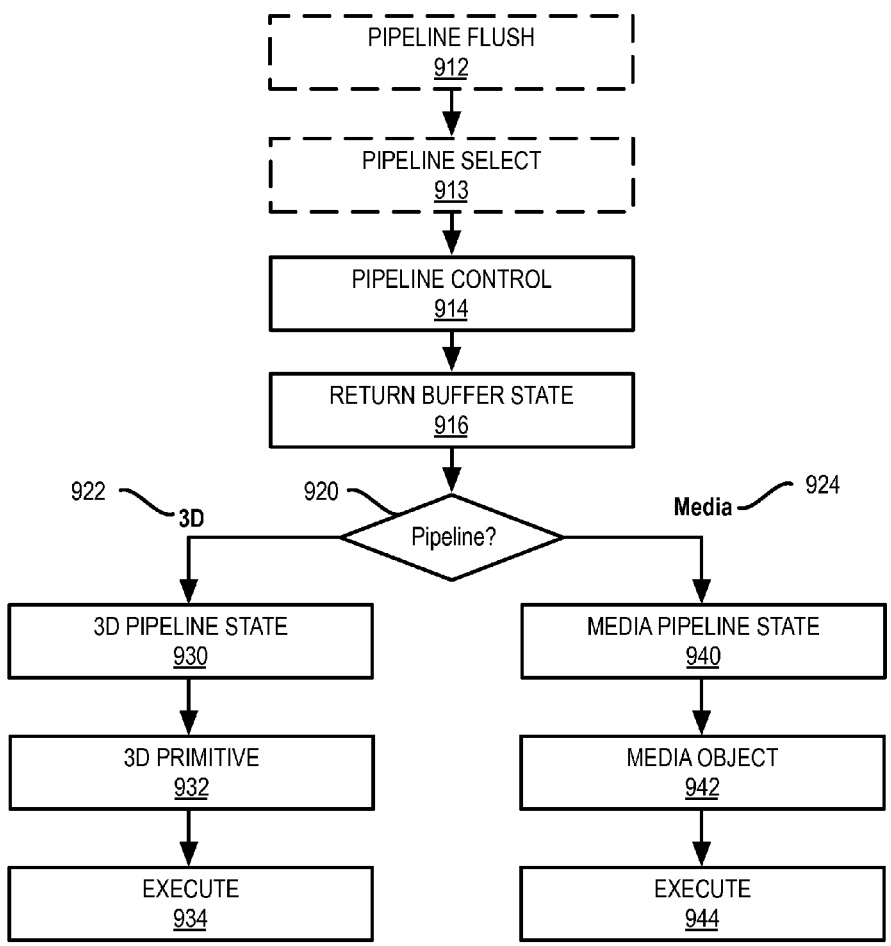
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
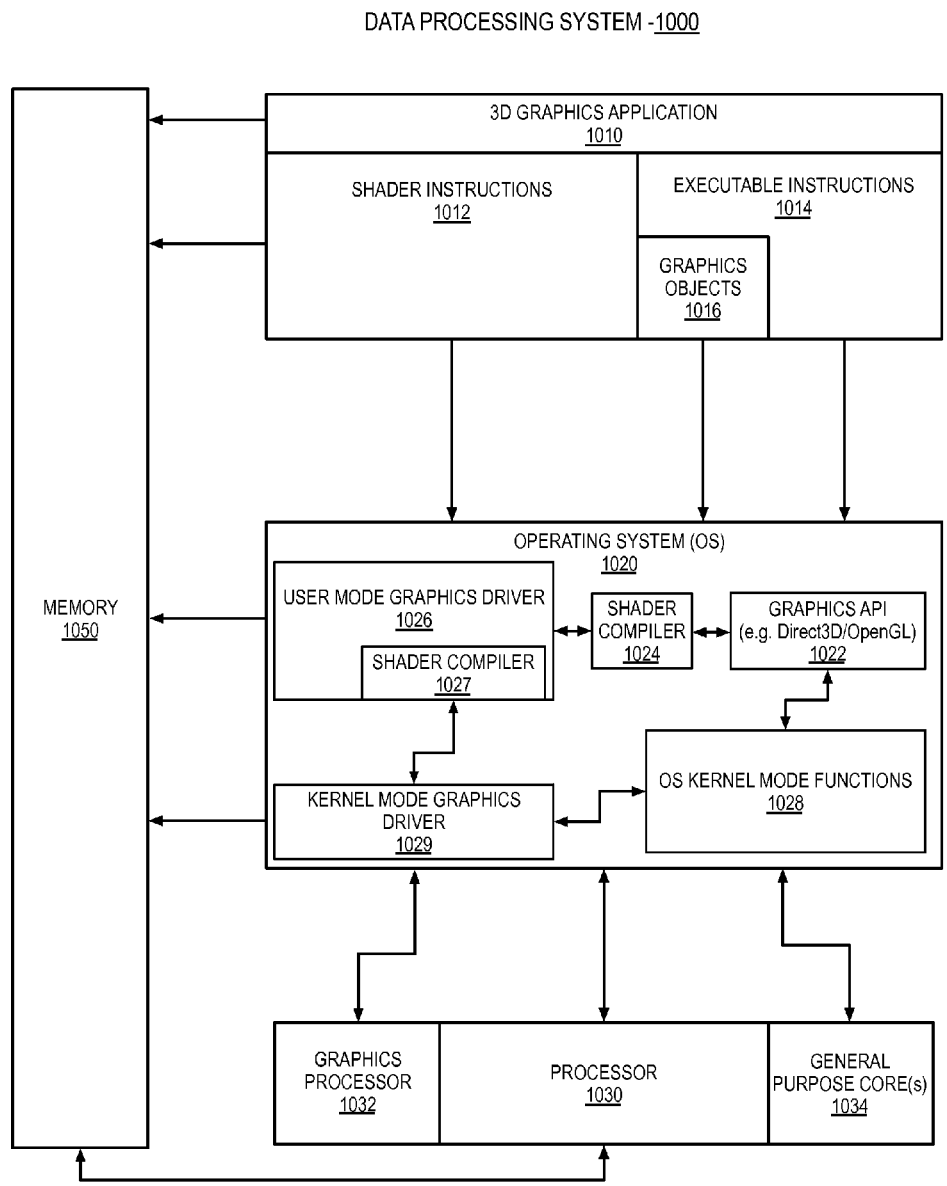
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions and/or data which represent various logic within the processor. When read by a machine, the instructions and/or data may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
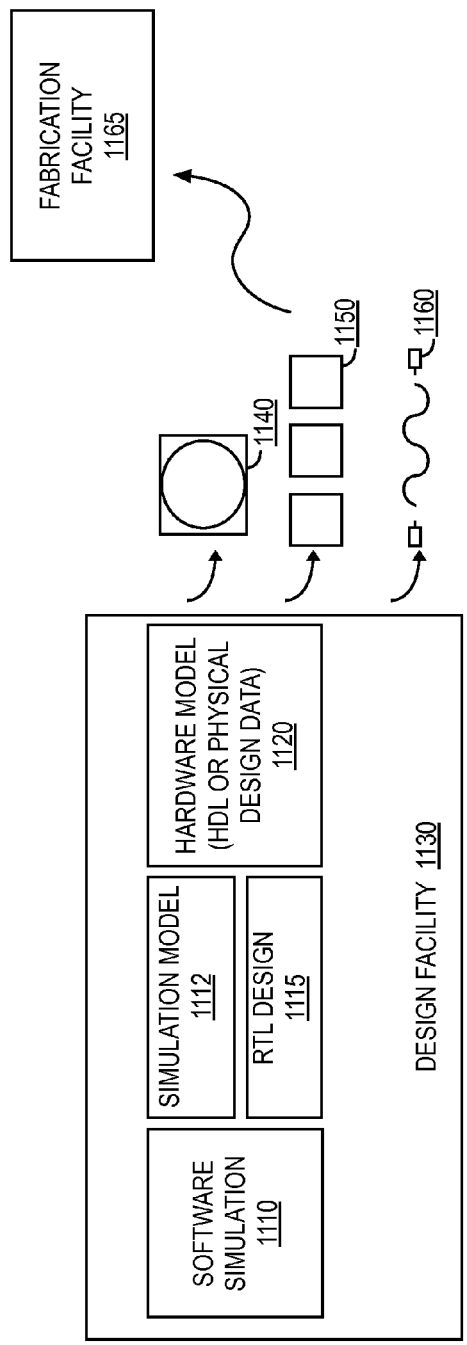
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
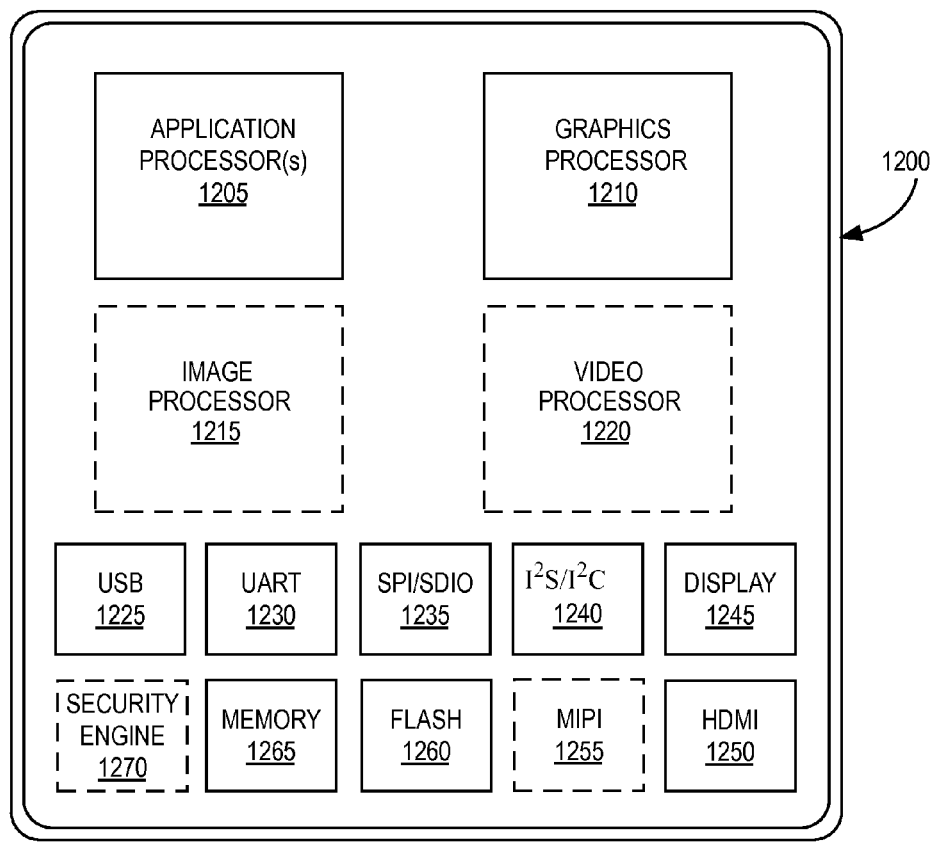
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Hierarchical Quadrant Based Coverage Testing for Rasterization

Embodiments of the graphics hardware described herein implement techniques to reduce the number of clock cycles expended to render a 3D graphics scene by avoiding the performance of extraneous operations during the scan conversion stage of polygon/triangle rasterization. In one embodiment, iterator logic performs a snake-like edge walk of triangle edges such that next block on the down row is in the vicinity of the previous block, which maintains cache performance during the processing of successive rows. In one embodiment, a coarse level iterator logic performs an optimize process for determining if sample quadrants within a square region of pixels are completely covered or completely uncovered. Determining if sample quadrants are completely covered or uncovered reduces the computational burden of determining pixel level coverage in downstream elements of the rasterization pipeline by avoiding pixel level coverage testing for completely covered and uncovered sample quadrants.

Rasterization Overview

Figure 13:
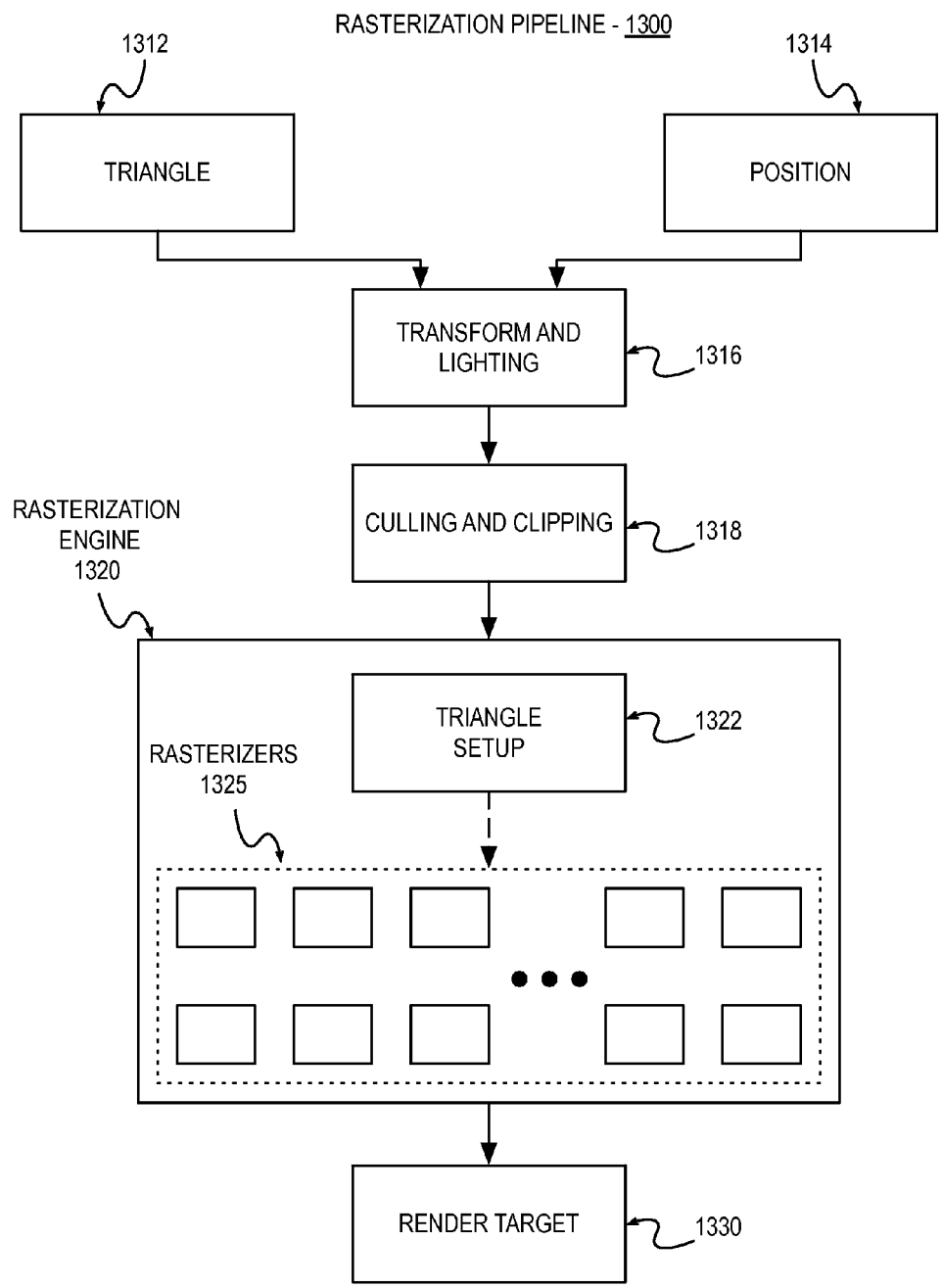
FIG. 13 is a block diagram of an exemplary rasterization pipeline.

FIG. 13 shows an exemplary rasterization pipeline 300. In one embodiment, logic associated with the rasterization pipeline 300 may be found in the render output pipeline 870 of FIG. 8. Triangle 1312 and position 1314 data may be input to transform and lighting logic 1316, which applies camera transformations to the 3D scene geometry represented by the triangles and positions to produce 2D screen space projected triangles. The transform and lighting logic also applies the light source parameters to produce vertex colors for each vertex of the screen space projected triangles. The screen space projected triangles may be input to culling and clipping function 1318. The culling and clipping function culls and clips the triangles according to a current view frustrum.

The rasterization engine 1320 can process triangles that are wholly or partially visible. The wholly or partially visible triangles are input to triangle setup function 1322. The triangle setup function utilizes selected rasterizers 1322 for each triangle. Multiple rasterizers 1325 may be included within the rasterization engine 1320 and multiple triangles may be rasterized in parallel. The rasterizers output a sequence of fragments that cover the shape of the triangle. The output fragments may be shaded or further processes by pixel shader logic before being written to a render target 1330 in memory.

Figure 14:
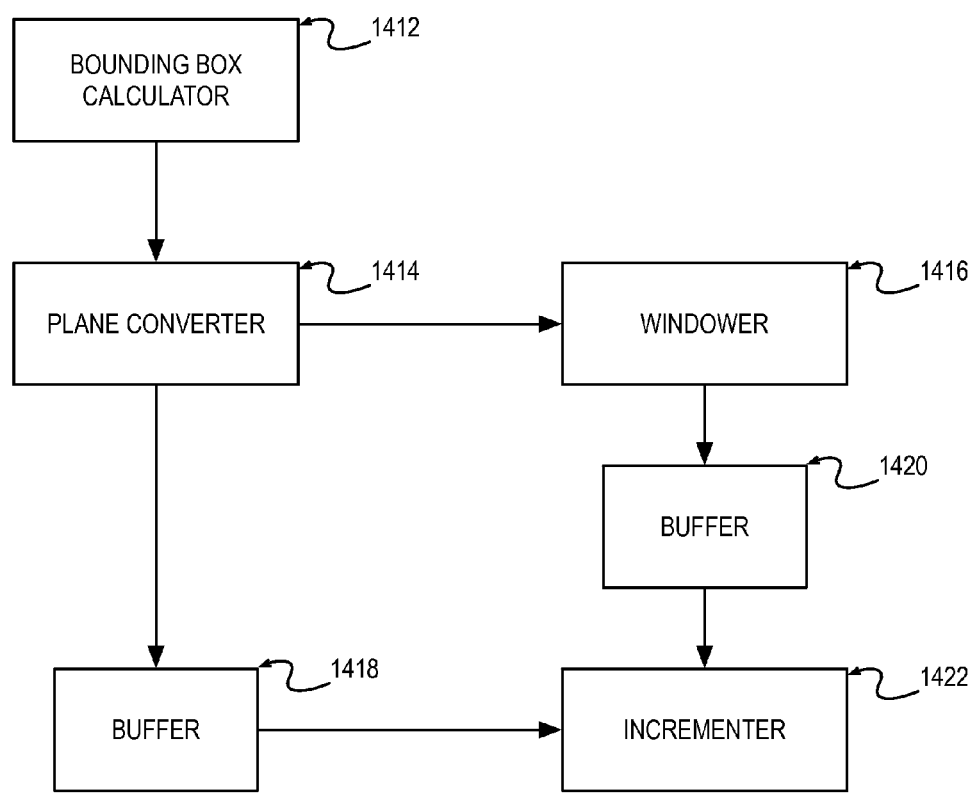
FIG. 14 is a block diagram of an exemplary rasterizer.

FIG. 14 is a block diagram of an exemplary rasterizer 1400. The rasterizer 1400 illustrates a portion of rasterizer logic for exemplary purposes and is not intended to be limiting as to the various embodiments. The exemplary rasterizer 1400 includes a bounding box calculator 1412, a plane converter 1414, a windower 1416, and an incrementer 1422. The rasterizer 1400 can also include one or more buffers, such as buffer 1418 and 1420. For each triangle to be processed, the bounding box calculator 1412 can compute the vertical and horizontal extent, in spans, for the area enclosing the triangle. The bounding box horizontal and vertical boundaries are passed to the plane converter 1414. The plane converter 1414 also receives as input attribute values for each vertex of the triangle. The plane converter 1414 computes planar coefficients (Cx, Cy and Co) for each attribute of the polygon, including the edges. The three planar coefficients consist of a starting attribute value at the pixel center, Co, and gradient values in both the horizontal and vertical directions, Cx and Cy respectively.

In addition the plane converter 1414 also computes three line coefficients, Lo, Lx and Ly, which are output to the windower 1416 for each edge of the triangle. The line equation values are used in further calculations to allow the windower 1416 to determine which spans are either covered or intersected by the polygon. Spans that are completely covered are referred to as fully covered. Spans that are intersected by the triangle without completely covering the polygon are referred to as partially covered. The three planar coefficients (Cx, Cy and Co) are output to a buffer 1418 for each vertex attribute associated with the vertex. The attributes are all assumed to be planar, in that both the horizontal and vertical increments will be constants. Thus, the attributes values can be calculated for any pixel on the screen by adding or subtracting multiples of Cx and/or Cy as the interpolation hardware (e.g., incrementer 1422) walks the triangle.

The incrementers 1422 receive the span coverage data from the windower in addition to receiving planar coefficient values from the plane converter. The incrementers 1422 utilize the data from both the windower 1416 and plane converter 1414 to walk or traverse the polygon in those intersected spans, pixel by pixel. The incrementer can be configured such that, as the incrementer 1422 visits each pixel, vertex attribute values are interpolated to each pixel by adding a constant fixed-point number, Cx or Cy, in either the horizontal or vertical direction respectively.

Hierarchical Coverage Testing

Figure 15:
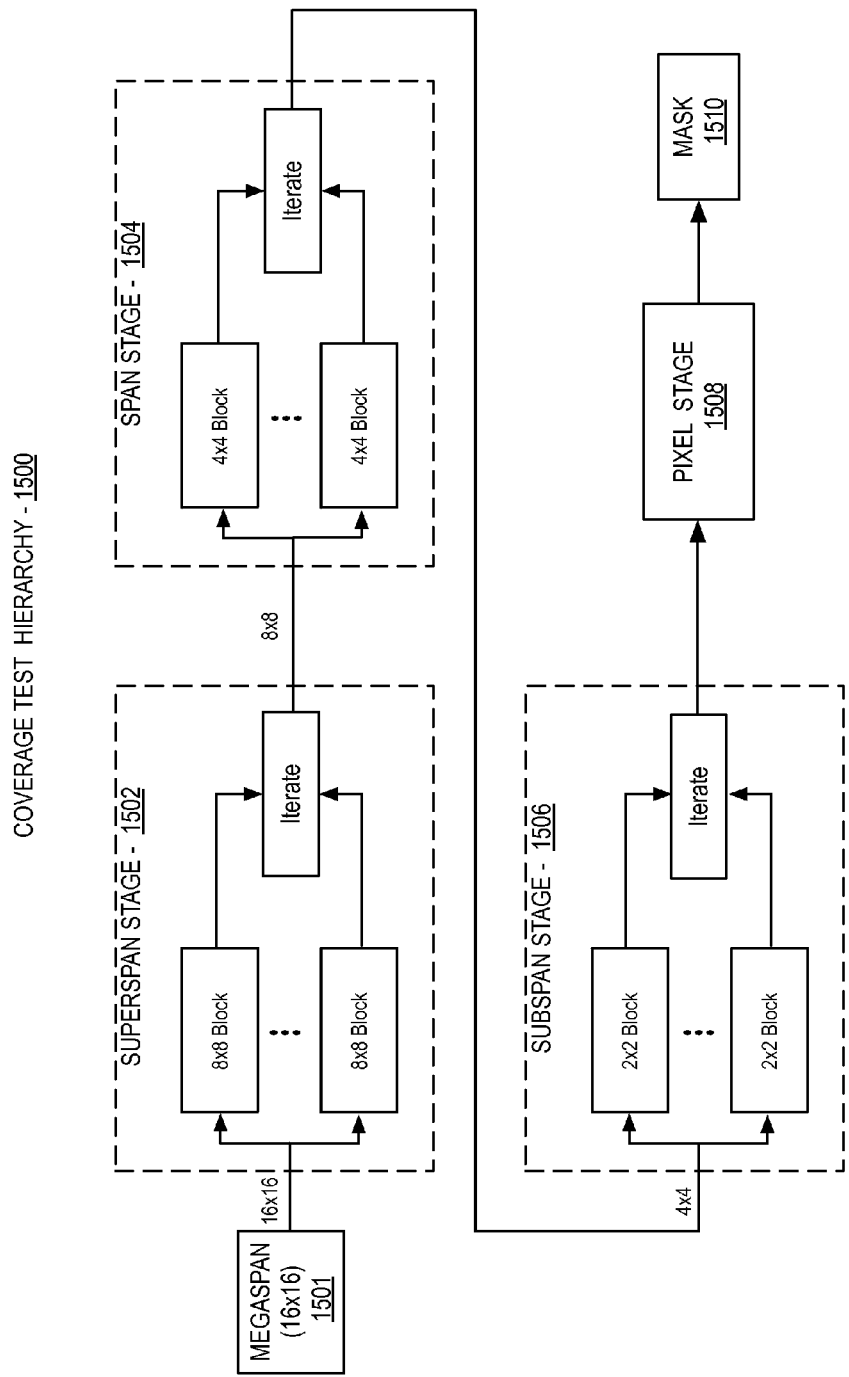
FIG. 15 is a block diagram of an coverage test hierarchy, according to an embodiment.

FIG. 15 is a block diagram of coverage test hierarchy 1500, according to an embodiment. In one embodiment, a coverage test can be performed on a 16×16 "megaspan" 1501 block of pixels. The megaspan block can be processed and divided it into four 8×8 "superspan" blocks within a "superspan" stage 1502. In one embodiment the superspan stage 1502 performs parallel coverage tests on multiple 8×8 blocks. Each 8×8 block that is at least partially covered can be further divided into four 4×4 blocks within a "span" stage 1502. During the span state, 1504, void spans can be discarded without further processing and each at least partially covered 4×4 span can be divided into four 2×2 blocks within a "subspan" stage 1506. A final pixel stage 1508 then generates the mask 1510. In one embodiment, at each stage

1502, 1504, 1506, a fully covered superspan, span, or subspan can bypass the remaining stages and be flagged as fully covered.

Figure 16:
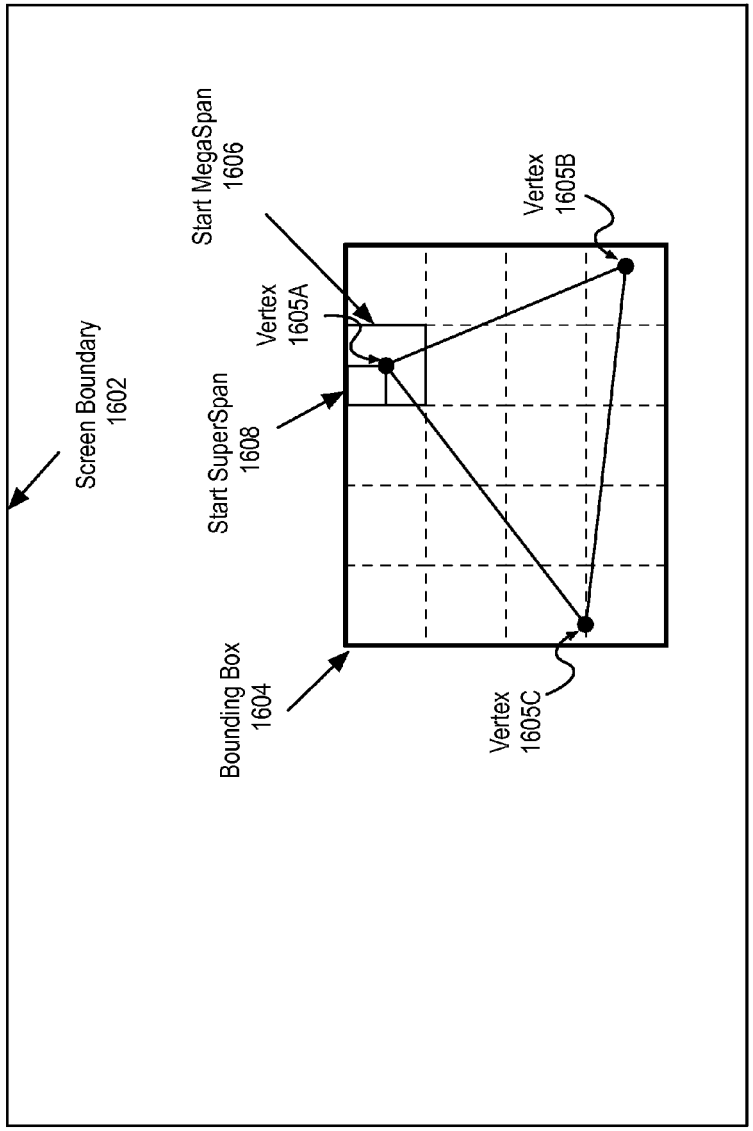
FIG. 16 is an illustration of features related to an exemplary triangle rasterization process.

FIG. 16 is an illustration of exemplary rasterization elements 1600. A triangle is illustrated which is defined by three vertices (e.g., vertex 1605A-C). A bounding box 1604 can be drawn around the triangle and a coarse level iterator can iterate through successive megaspan blocks (e.g., 16×16 blocks) of pixels beginning with a start megaspan 1606. The start megaspan 1606 can include four superspan quadrants, including a start superspan 1608. Block selection logic can be configured to select the screen space coordinates of the start megaspan 1606 or start superspan 1608 as an initial block of pixels and edge determination logic can analyze the initial block of pixels to determine a set of fully covered quadrants of the initial block of pixels.

The edge determination logic can additionally analyze a block of pixels adjacent to the initial block of pixels (e.g., an adjacent megaspan) to determine whether the block of adjacent pixels is void, meaning that no samples within the selected block of pixels are within the triangle, indicating that the selected block of pixels is completely outside of the triangle. Megaspans that are completely outside of the triangle can be discarded and further iteration is not performed on those blocks. For each partially covered megaspan, an additional coverage check can be performed to determine a finer level of coverage at the superspan (e.g., 8×8), span (e.g., 4×4), subspan (e.g., 2×2), and pixel level as shown in FIG. 15.

While rasterization is generally described herein at the pixel sample level, embodiments also support multi-sample anti-aliasing (MSAA), in which multiple sample locations are used for each pixel. For example, where 4×MSAA is enabled, screen coverage values for polygon primitives may be determined using 4 sample points per pixel. However, to avoid obscuring the details of the embodiments, concepts will generally be described using one sample point at the center of each pixel.

Figure 17:
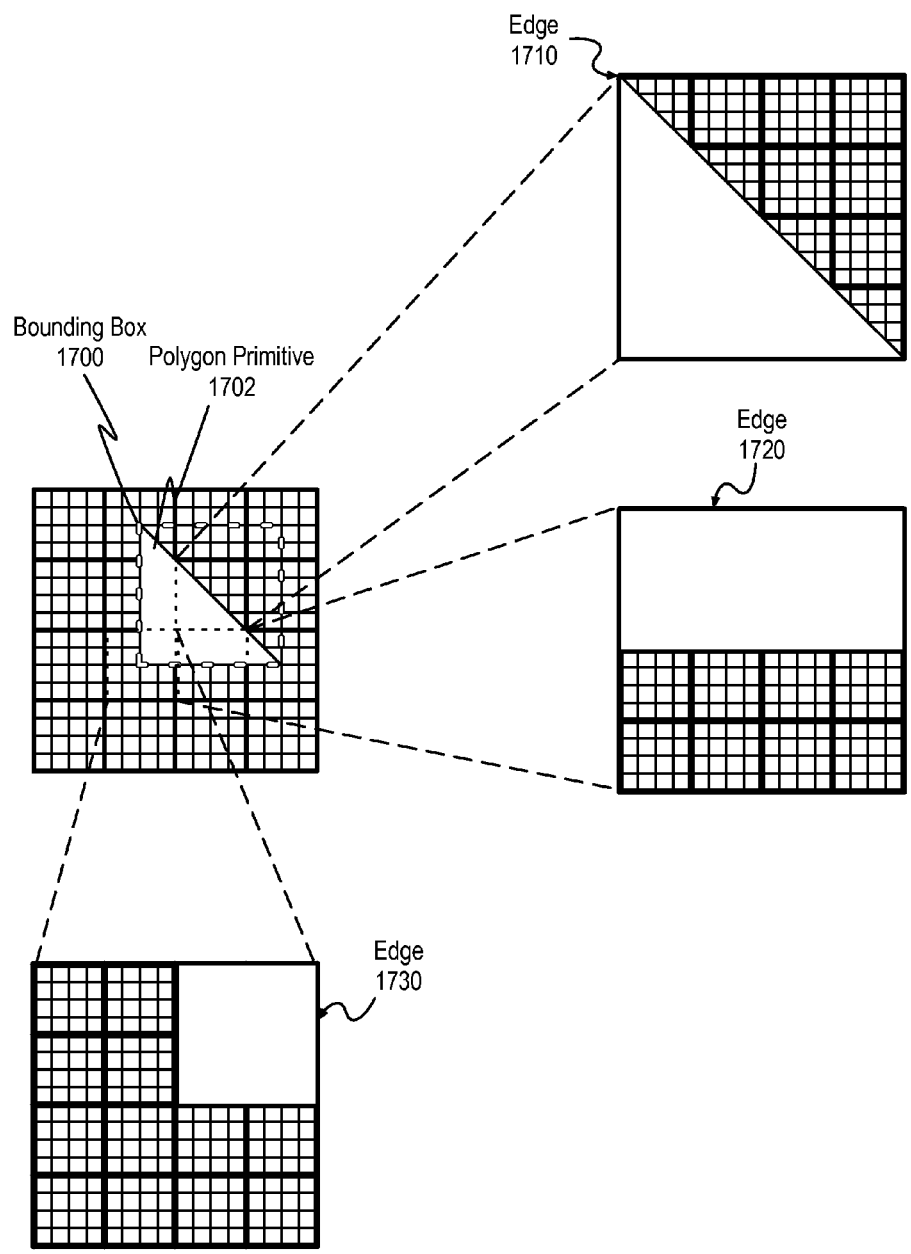
FIG. 17 illustrates exemplary polygon coverage for multiple edges across multiple pixel blocks.

FIG. 17 illustrates exemplary polygon coverage for multiple edges across multiple pixel blocks. In one embodiment, coverage testing for an input polygon (e.g., triangle) primitive 1702 is determined by dividing each input primitive into constituent edges, which for the exemplary polygon primitive 1702 include a right edge 1710, a bottom edge 1720, and a left edge 1730. The specific edge types for a primitive can vary based on the primitive type and primitive orientation. Additionally, while the illustrated polygon primitive 1702 is a triangle, other polygon primitive types (e.g., rectangles, lines, etc.) may also be used.

In one embodiment, bounding box logic (e.g., bounding box calculator 1412 of FIG. 14) can be configured draw a bounding box rectangle around a region of screen space that contains the primitive. The bounding box rectangle can be a clip rectangle, such that anything pixels outside of the bounding box are classified as void. Coverage testing may be performed within the rectangle defined by the bounding box. In one embodiment, coverage determination for pixels within the bounding box 1700 is performed by deriving line coefficients $L_0$, $L_x$, and $L_y$ for each edge of the polygon. The $L_0$ value of an edge of a primitive is based on a measure of distance to the edge from a reference point. In one embodiment, the reference point is the center of the megaspan, superspan, or span being tested. Other reference points may be used based on the rasterization algorithm or implementation of the rasterization algorithm.

For the algorithm described herein, for an edge having a vertex coordinate $(X_{vertex}, Y_{vertex})$, the $L_0$ to a reference point having coordinates $(X_{ref}, Y_{ref})$ is defined as:

$$L_0 = L_x \times (X_{ref} - X_{vertex}) + L_y \times (Y_{ref} - Y_{vertex})$$

Where, for each edge:

$$L_x = \frac{-\Delta Y}{\Delta X + \Delta Y} \text{ and } L_y = \frac{\Delta X}{\Delta X + \Delta Y}$$

The above equations apply for screen spaces having an origin in the upper left hand corner and should be adjusted accordingly for screen spaces having a different origin. $\Delta Y$ and $\Delta X$ for an edge is defined as the absolute value of the differences in the Y and X coordinates for each edge.

$L_x$ and $L_y$ generally describe the change in distance with respect to x and y directions. $L_x$ describes the change in distance in the x direction from one pixel to the next pixel along an edge. $L_y$ describes the change in distance in the y direction from one pixel to the next pixel along an edge. A rasterizer can determine the distance using a perpendicular (e.g., Euclidian) distance, a Manhattan (e.g., rectilinear) approximation of the distance, or some other well-known distance metric. The edge coefficient values are planar values, such that the distance to the edge can be calculated for any pixel on the screen by adding or subtracting multiples of $L_x$ and/or $L_y$.

In some embodiments, a graphics engine as described herein includes rasterizer logic having a windower/mask unit that performs functions of the windower 1416 shown in FIG. 14. The windower/mask unit receives start values ($L_0$, $L_x$, $L_y$) for each edge and walks through the spans or superspans that are either covered by the polygon (fully or partially) or have edges intersecting the span boundaries. In one embodiment, the pixel mask is determined by solving the line equations at the pixel centers for the three edges of the triangle, where the line equation for each edge is defined as:

$$L_0 + (L_y \times X) + (L_x \times Y)$$

A positive answer for all edges indicates a pixel is inside the polygon; a negative answer from any of the edge indicates the pixel is outside the polygon.

Various rasterization algorithms use various methods of performing triangle iteration and vary in several aspects, including in the mechanism used to evaluate coverage for a span or superspan of pixels, and in the traversal order of the pixels of the triangle. In one embodiment, the windower logic uses a three-register stack. A first register is to save the current span during left and right movements. A second register is to store the best place from which to proceed to the left. A third register is to store the best place from which to proceed downward. During the scan conversion process the windower can push the current location onto one of the stack. Popping the stack allows the scan conversion process to change directions and return to a previously visited span without retracing steps. Multiple pixels can be checked in parallel using vector-processing logic.

Snake Walk Iteration

An existing rasterizer implementation uses a course iterator to walk a set of superspans using a best-down heuristic beginning at a starting 16×16 pixel block megaspan that is at least partially covered by an input polygon. The iterator logic can check the start megaspan, as well as adjacent megaspans and/or superspans to the left or right of the start superspan until an uncovered superspan is discovered or the bounding box is reached. After walking into an uncovered superspan or reaching the bounding box the iterator reverses direction. Once the uncovered boundaries within a row are determined, the iterator proceeds to the next row. This iteration method will occasionally spend hardware cycles walking superspans that are completely uncovered by the triangle. Walking completely uncovered superspans can be considered a waste of rasterizer cycles, as no useful output is produced from those walks.

Figure 18:
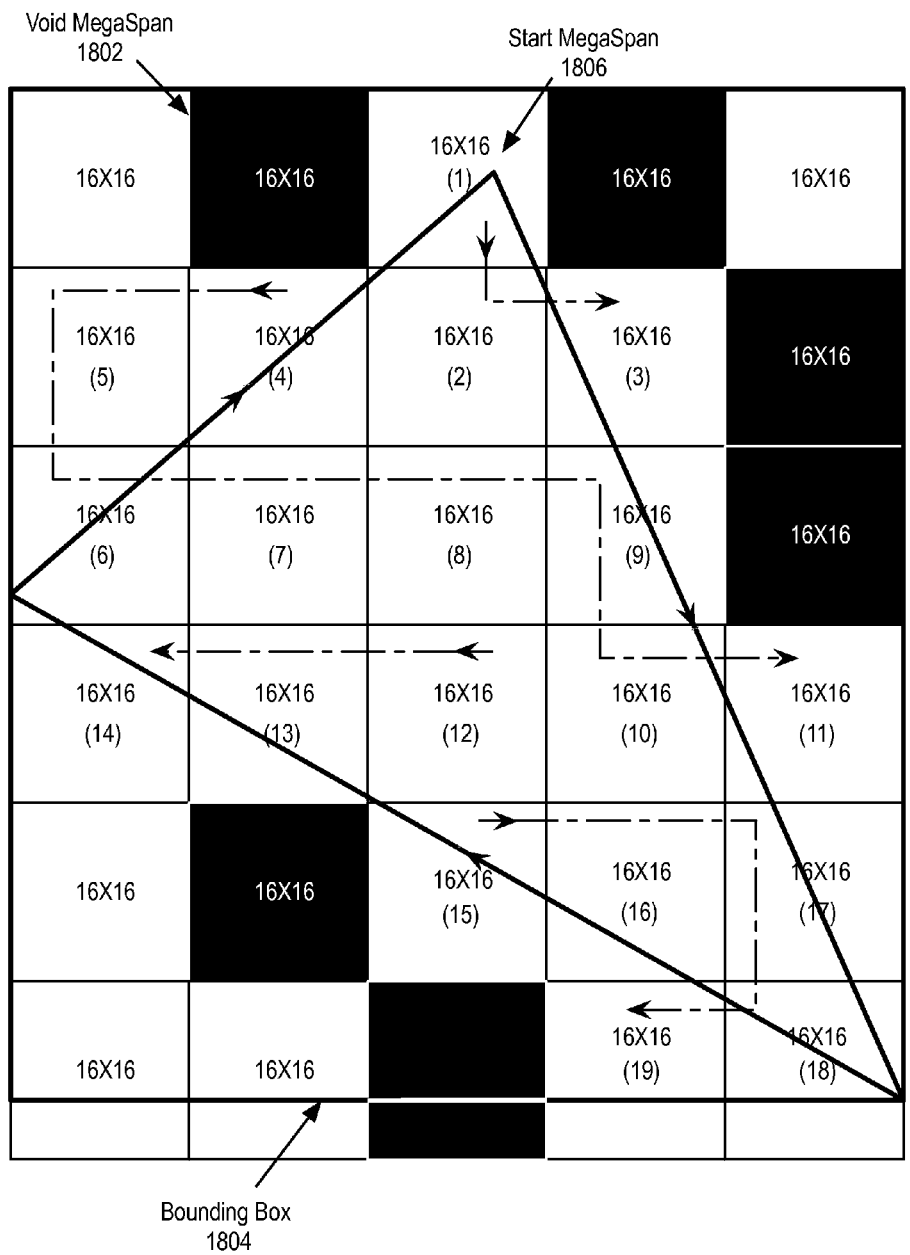
FIG. 18 is an illustration of snake walk iteration during triangle scan conversion, according to an embodiment.

FIG. 18 is an illustration of snake walk iteration during triangle scan conversion, according to an embodiment. Snake walk iteration differs from the iteration logic of an existing rasterizer in that the void megaspans (e.g., void megaspan 1802) illustrated as black rectangles are not traversed during the iteration. In FIG. 18, a triangle primitive is illustrated within a bounding box 1604. Each 16×16 block represents a megaspan block of pixels. The traversal order is shown as a number in parenthesis for each block that is walked and indicated by a dotted line starting with the start megaspan 1806, which is indicated as (1). The snake walk logic avoids walking over void megaspans by performing a conservative evaluation of the next block in walking order in parallel with performing a detailed evaluation of an iterated block. The two evaluations can be performed within the same clock cycle. This process allows the iterator logic to perform a continuous look ahead in the direction of walk during the process. The look ahead allows the iterator to determine whether there is a need to continue walking in a given direction, avoiding the expenditure of clock cycles to perform a walk to an unproductive pixel block. The snake walk pattern is enabled by an additional evaluation of the down block from the current block when evaluating a move to the next row. This eliminates overhead of computing a "best down" for a flowing angle bisector, which is performed in an existing iterator.

While avoiding void megaspans, the iterator also does not re-walk previously iterated blocks by pushing spans that are conservatively evaluated as valid into left, right, or down registers, which are pushed when a walk in a particular direction is completed. For example, after walking block (3), block (4) can be walked without re-walking (2), and block (12) can be evaluated without re-walking block (10). Block (15) can be evaluated without re-walking blocks (13) or (14).

In various embodiments, the snake walk optimization is implemented by adding one or more level(s) of iteration logic in the superspan stage (e.g., superspan stage 1502 as in FIG. 15) to determine the walk direction and the next superspan address computation. In one embodiment, the snake-walk optimization adds an additional adder and additional comparators to the superspan stage logic. Implementations of the snake walk optimization can generally be constructed using fewer than 1500 additional logic gates. In one embodiment the parallel compare results for the next superspan become available in the same cycle as the current superspan comparison information.

Details of one embodiment of the snake walk optimization are as follows. In order to avoid traversal to an uncovered 16×16 block, an optimization of the iterator logic is performed in which a current 16×16 block is processed in parallel with the next block (either the left or the right block). For a walk in the right direction a $NextL_0$ value is computed, in which:

$NextL_0 = CurrentL_0 + (16 \times L_x)$

For a walk in the left direction:

$NextL_0 = CurrentL_0 - (16 \times L_x)$

If for any of the edges $NextL_0$ is less than −8 times the Manhattan distance to the reference point, then the next block is fully uncovered by the triangle. Hence, the next block=pop(left-stack) if the walk is in the right direction or next block=pop(down-stack) if walk is in the left direction.

A valid left, right, or down 16×16 block is evaluated at every step in the walk. A valid 16×16 block is determined by a negative test (e.g., checking if it is completely void). If the block is not void, it is considered valid. A conservative radius test is performed to check if any edge Lo is less −8 times the Manhattan distance or if the 16×16 block is outside of the bounding box.

Figure 19:
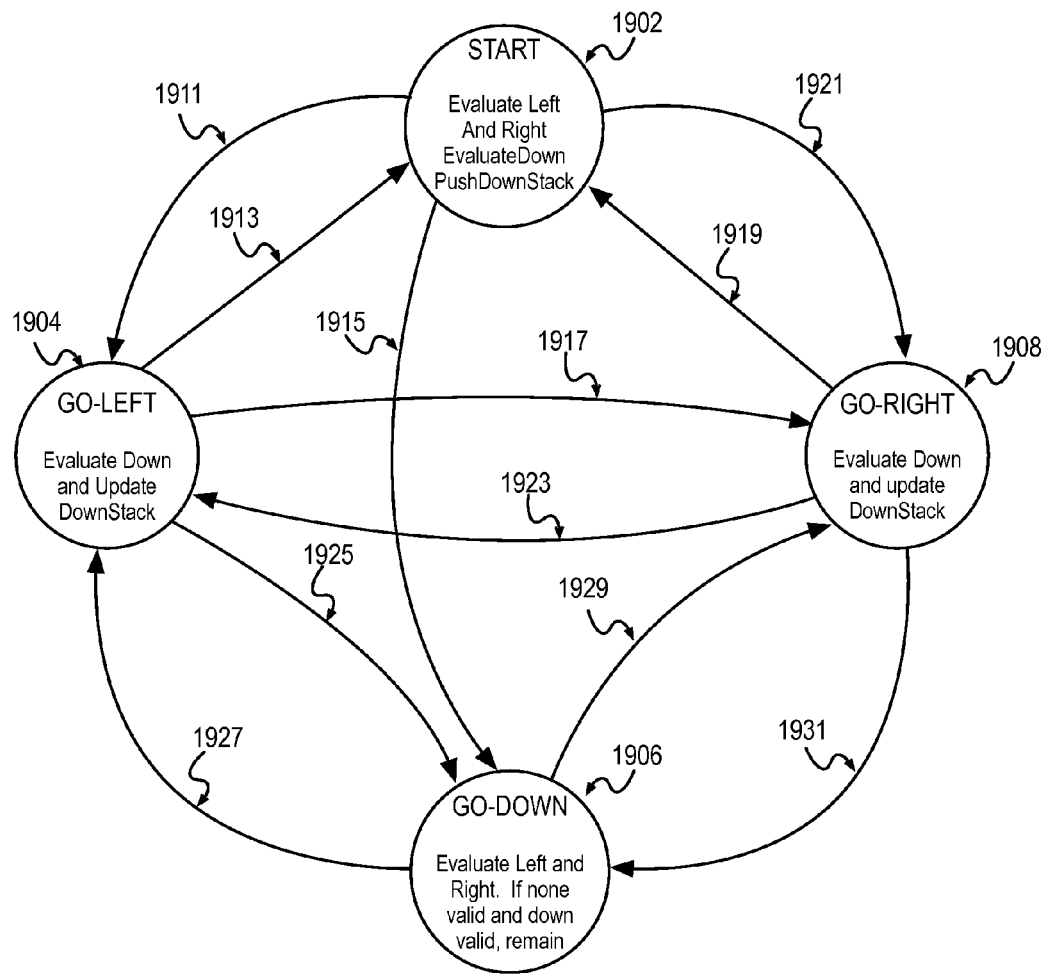
FIG. 19 is an iterator state machine for snake walk iteration, according to an embodiment.

FIG. 19 is an iterator state machine 1900 for snake walk iteration, according to an embodiment. In one embodiment, the state machine includes a start state 1902, a go-left state 1904, a go-down state 1906, and a go-right state 1908, each state describing a walk direction of the snake walk iterator. The states and transitions shown in FIG. 19 and Table 1 are exemplary of one embodiment, but not limiting as to all embodiments. In such embodiment, the evaluated and processed blocks described below refer to 16×16 blocks, although sample quadrants of differing size may be used in other embodiments. For each of the go-left state 1904, go-down state 1906, and go-right state 1908, the snake walk iterator can continue to walk in the indicated direction until a state transition occurs, conditioned on a state transition condition. The state transition conditions and associated actions, if any, are shown in Table 1 below.

TABLE 1

Iterator State Machine Transitions

| Reference | Condition | Action |
| --- | --- | --- |
| 1911 | LeftValid & !RightValid | None |
| 1913 | LeftWalkDone & RightStackEmpty & DownStackEmpty | None |
| 1915 | !RightValid & !LeftValid & DownValid | LastWalk = Right |
| 1917 | LeftWalkDone & !RightStackEmpty | PopRightStack |
| 1919 | RightWalkDone & LeftStackEmpty & DownStackEmpty | None |
| 1921 | RightValid | If left-valid, PushLeftStack |
| 1923 | RightWalkDone & !LeftStackEmpty | PopLeftStack |
| 1925 | LeftWalkDone & RightStackEmpty & !DownStackEmpty | PopDownStack |
| 1927 | (LASTWALK == LEFT) & LeftValid | PushRightStack |
| 1929 | (LASTWALK == RIGHT) & RightValid | PushLeftStack |
| 1931 | RightWalkDone & LefStackEmpty & !DownStackEmpty | PopDownStack |

As shown in FIG. 19 and Table 1, one embodiment of the snake walk iterator begins with a start state 1902, in which operations including evaluating a left and right superspan block, evaluating a down block, and pushing a down stack. The down stack push is performed if the down block is evaluated as valid. If the right block is not valid and the left block is valid, state transition 1911 is performed to the go-left state 1904 to perform walk in the left direction. When the left walk is done, if the right stack is empty and the down stack is empty, state transition 1913 to the start state can be performed, in which the left, right and down blocks from the current block are evaluated. A state transition 1917 from the go-left state 1904 to the go-right state 1908 can be performed if the left walk is done and the right stack is not empty, or a state transition 1925 to the go-down state can be performed if the right stack is empty and the down stack is not empty. During the state transition 1917 to the go-right state 1908, the right stack is popped. During the state transition 1925 to the go-down state 1906, the down stack is popped. In both of the go-left state 1904 and the go-right stage 1908, an evaluate down operation is performed and the down stack may be updated.

From the start state 1902, state transition 1921 to the go-right state 1908 can be performed if the right block evaluates as valid. During state transition 1921, if the left block was evaluated as valid at the start state 1902, a left stack push is performed. If neither the left or right blocks are valid at the start state 1902, state transition 1915 to the go-down state 1906 is performed.

From the go-right state 1908, the iterator can transition back to the start state 1902 via transition 1919 when the right talk is down and both the left stack and down stacks are empty. If the down stack is not empty at the go-right state 1908, the iterator can transition to the go-down state 1906 via transition 1931. During the transition 1931, the down stack is popped.

The iterator can remain in the go-down state 1906 as long as the down block is valid and the left and right blocks are not valid. From the go-down state 1906, if the last walk direction (e.g., LASTWALK) is to the left direction, if or when a left block is evaluated as valid, the iterator can transition 1927 to the go-left state 1904. If the last walk direction is to the right, if or when a right block is evaluated as valid, the iterator can transition 1929 to the go-right state 1908. Once in the go-right state 1908, the iterator can transition 1923 to the go-left state 1904 when the right walk is complete and the left stack is not empty. During the transition 1923, the iterator can pop the left stack.

In one embodiment, the iterator state machine 1900 transitions and actions correspond with exemplary rasterizer logic to perform snake walk iteration shown in Tables 2-6 below. Table 2 shows exemplary logic for snake walk iteration.

TABLE 2

Exemplary Logic for Snake Walk Iteration

```
snake-walk( ) {
    Current16×16 = StartSuperSpan;
    If (BoundingBoxIsInsideStartSuperSpan( ))
        ProcessCurrent16×16( ); // bypasses the walker
    else{
        LastWalk = Right;
        ProcessAndEvaluateBoth( );
    }
    ProcessNextRight16×16( );
    ProcessNextLeft16×16( );
DOWN:
    If (DownStackIsEmpty and Current16×16AtBBCR)
        END_WALK( );
    else if(!DownStackIsEmpty) {
        PopDownStack( );
        ProcessAndEvaluateBoth( );
        If(LastWalk == Right) {
            ProcessNextRight16×16( );
            ProcessNextLeft16×16( );
        } else {
            ProcessNextLeft16×16( );
            ProcessNextRight16×16( );
        }
    } else if(DownStackIsEmpty and !Current16×16AtBBCR) {
        NextDown = CurrentLo + 16*Ly; // this fixes the diagonal line
        PushDownStack( );
        GOTO DOWN
        }
    }
}
```

As shown in Table 2, if the bounding box generated for a triangle is inside the start superspan, the iterator walker logic for snake walk iteration can bypass the walk and process the current superspan for coverage, as coverage information for the superspan can be derived for the sample quadrant based on a first and last marker associated with the bounding box. Otherwise, the snake walk iterator logic can evaluate the left, right and down superspans in parallel with processing the start superspan, then process any valid blocks to the left or left and right of the start superspan. The iterator walker logic continues to walk the triangle until the bounding box clip rectangle (BBCR) is within the current block and the iterator down stack is empty, indicating that no valid down blocks are present.

Exemplary rasterizer logic to perform the ProcessAndEvaluateBoth Function of Table 2 is shown in Table 3 below.

TABLE 3

Exemplary logic for ProcessAndEvaluateBoth Function

```
ProcessAndEvaluateBoth( ){
{
    // parallel compute begin
    RightValid = EvaluateRight16×16( );      // This function
                                              evaluates if the
                                              // right 16×16 is valid
    If(RightValid), PushRightStack( );
    LeftValid = EvaluateLeft16×16( );        // This function
                                              evaluates if the
                                              // left 16×16 is valid
    If(LeftValid), PushLeftStack( );
    DownValid = EvaluateDown16×16( );        // This function
                                              evaluates if the
                                              // down 16×16 is valid
    If(DownValid), PushDownStack( );
    ProcessCurrent16×16( );
    // parallel compute end
}
```

The ProcessAndEvaluateBoth( ) logic shown in Table 3 performs a left, right, and down evaluation in parallel with processing the current superspan. For each left right and down 16×16 that is evaluated as valid, a stack register associated with the left, right, and/or down walk direction is pushed. Exemplary logic for ProcessNextRight16×16( ) and ProcessNextLeft16×16( ) is shown in Table 4 below.

TABLE 4

Exemplary ProcessNextRight16×16( ) Logic

```
ProcessNextRight16×16( )
{
    while(RightValid){
        ComputeRightLo( ); // For all edges,
        RightLo = CurrentLo + 16*Lx;
        ProcessAndEvaluateInWalk( );
        LastWalk = Right;
    }
}
```

Exemplary logic for ProcessNextLeft16×16( ) is shown in Table 5 below.

TABLE 5

Exemplary ProcessNextLeft16×16( ) Logic

```
ProcessNextLeft16×16( )
{
    while(LeftValid){
        ComputeLeftLo( );     // For all edges,
        LeftLo = CurrentLo − 16*Lx
```

TABLE 5-continued

Exemplary ProcessNextLeft16x16( ) Logic

```
        ProcessAndEvaluateInWalk( );
        LastWalk = Left;
    }
}
```

The logic for each of the process next left and process next right functions shown in Tables 4-5, where RightLo and LeftLo represent the NextL$_0$ for the upcoming block. If the computed RightLo or LeftLo is less than −8 times the Manhattan distance to the reference point, then the next 16×16 is fully uncovered by the triangle. Hence, the next 16×16 block=pop(left-stack) if the walk is in the right direction or next 16×16 block=pop(down-stack) if walk is in the left direction.

A valid left, right, or down 16×16 block is evaluated at every step in the walk. A valid 16×16 block is determined by a negative test (e.g., checking if it is completely void). If the block is not void, it is considered valid. A conservative radius test is performed to check if any edge has an Lo that is less −8 times the Manhattan distance or if the 16×16 block is outside of the bounding box.

Exemplary rasterizer logic to perform the ProcessAnd-EvaluateInWalk function of Tables 4-5 is shown in Table 6 below.

TABLE 6

Exemplary logic for ProcessAndEvaluateInWalk( )

```
ProcessAndEvaluateInWalk( ){
{
    // parallel compute begin
    if(LastWalk == Right){
        RightValid = EvaluateRight16x16( );   // This function
                                              evaluates if the
                                              // right 16x16 is valid
        If(RightValid), PushRightStack( );
    }
    else {
        LeftValid = EvaluateLeft16x16( );     // This function
                                              evaluates if the
                                              // left 16x16 is valid
        If(LeftValid), PushLeftStack( );
    }
    DownValid = EvaluateDown16x16( );         // This function
                                              evaluates if the
                                              // down 16x16 is valid
    If (DownValid), PushDownStack( );
        ProcessCurrent16x16( );
    // parallel compute end
}
```

As shown in Table 6, the ProcessAndEvaluateInWalk function performs parallel left, right and down evaluations in conjunction with processing detailed coverage for the current 16×16 block.

Embodiments providing for the snake walk iteration described herein differ from other known algorithms in several respects. The snake walk iteration removes wasteful clock cycles spent evaluating unlit sample blocks, where the number of clock cycles avoided equals the number of rasterizer cycles per block times the number of blocks avoided per polygon. The snake walk iteration can be performed in a manner that causes memory coherent traffic for Z buffer, color buffer, and texture streams.

Embodiments providing for snake walk iteration are not center based iteration algorithms and do not require the computation of polygon centerline. Instead, the snake walk iteration walks in a fixed direction for a block-row across contiguous blocks of screen space. Evaluations are performed in the left, right and down direction from a current block. Upward evaluations are not performed and the iterator does not walk in the upward direction in screen space. One embodiment is able to select all blocks at least partially covered by a polygon in a single pass without walking void blocks and includes an awareness of the presence of the bounding box, where the bounding box intersects a search block. Additionally, embodiments providing for the snake walk iteration are able to perform polygon iteration without going off of the edge of the polygon.

Hierarchical Quadrant Based Coverage Testing

Versions and implementations of the rasterization stage logic provided by embodiments described above are generally able to determine coverage for a given square block of screen space samples. The hierarchical quadrant based coverage testing optimization allows for quadrant level granularity for full coverage testing a sample block for blocks that have been determined to not be void. In one embodiment, quadrants of a square region of pixels can be discarded or determined to be fully covered, reducing the computational burden of determining actual pixel level coverage in downstream components of the rasterization logic instead of testing all square regions of a block for pixel level coverage. In one embodiment, up to three quadrants can be computed as fully covered. Embodiments make use of Manhattan approximations of the distance from a polygon edge and the orientation of the line with respect to aligned square screen space. Logical codes are then used to indicate fully void or fully covered quadrants, to enable detailed coverage analysis to bypass fully void or fully covered quadrants.

Figure 20:
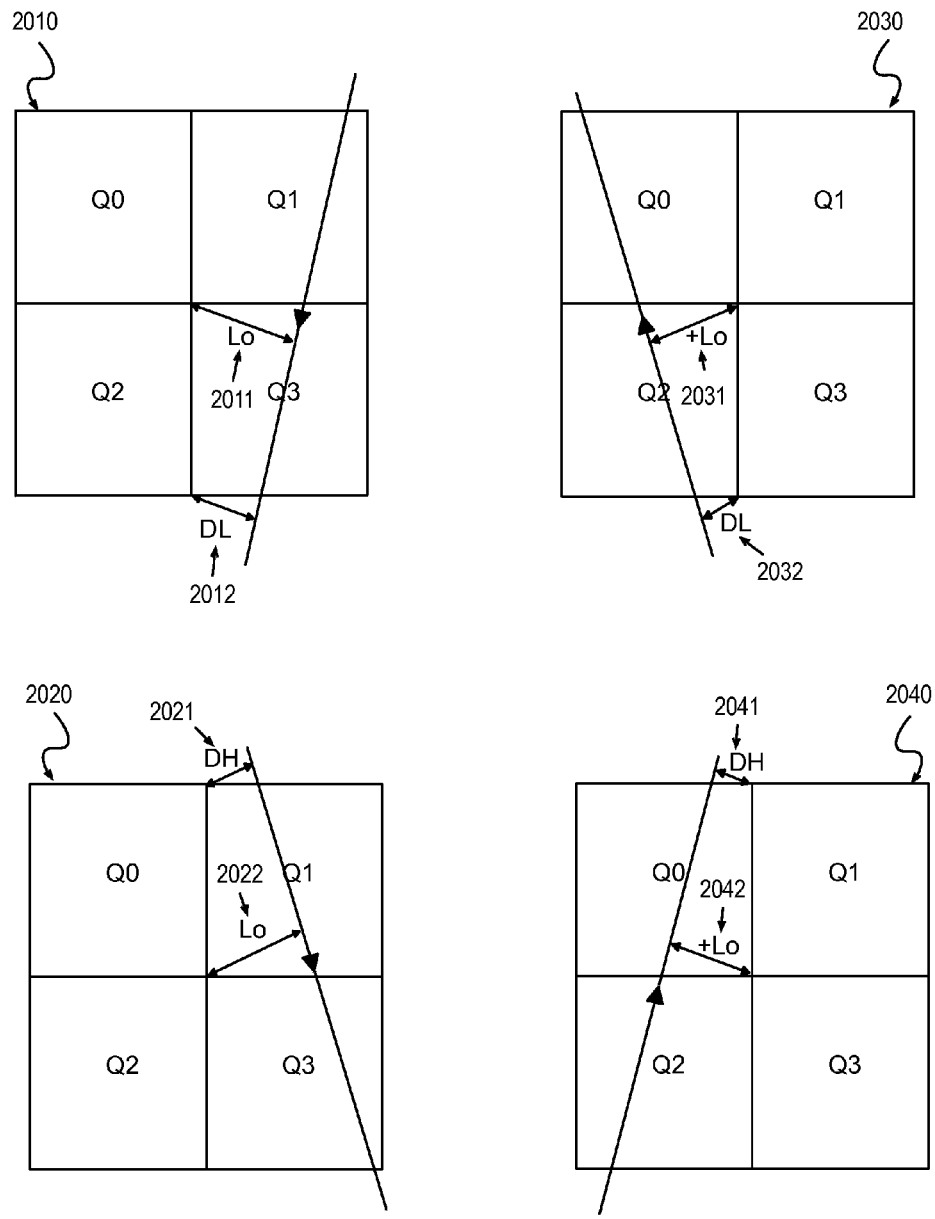
FIG. 20 is an illustration of a quadrant based coverage test applied for each edge, according to an embodiment.

FIG. 20 is an illustration of a quadrant based coverage test 2000, according to an embodiment. In one embodiment the quadrant based coverage testing 2000 illustrated is performed for each edge polygon edge to determine quadrant coverage for a 16×16 block of pixels divided into four 8×8 quadrants. A specific test (e.g., 2010, 2020, 2030, 2040) can be performed for each edge based on the signs of edge coefficients $L_x$ and $L_y$.

In one embodiment, test 2010 is performed where $L_x$ is negative and $L_y$ is negative. A distance L (e.g., DL 2012) is calculated for the edge based an $L_0$ 2011 from a reference point at the center of the four quadrants, where DL=$L_0$+4× $L_y$. If DL 2012 and $L_0$ 2011 are positive, then Q0 and Q2 are fully lit for the edge.

In one embodiment, test 2020 is performed where $L_x$ is negative and $L_y$ is positive. A distance H (e.g., DH 2022) is calculated for the edge based an $L_0$ 2021 from a reference point at the center of the four quadrants, where DH=$L_0$−4× $L_y$. If DH 2022 and $L_0$ 2021 are positive, then Q0 and Q2 are fully lit for the edge.

In one embodiment, test 2030 is performed where $L_x$ is positive and $L_y$ is negative. A distance L (e.g., DL 2032) is calculated for the edge based a +$L_0$ 2031 from a reference point at the center of the four quadrants, where DL=$L_0$+4× $L_y$. If DL 2032 and +$L_0$ 2031 are positive, then Q1 and Q3 are fully lit for the edge.

In one embodiment, test 2040 is performed where $L_x$ is positive and $L_y$ is positive. A distance H (e.g., DH 2042) is calculated for the edge based a +$L_0$ 2041 from a reference point at the center of the four quadrants, where DH=$L_0$−4× $L_y$. If DH 2042 and +$L_0$ 2041 are positive, then Q1 and Q3 are fully lit for the edge.

It should be noted that in order for a quadrant to be fully covered, all the edges have to confirm to having that quadrant lit. As the coverage testing illustrated is applied for each edge, to determine full coverage for the polygon, the afor the polygon applies a bit-wise and coverage mask for each edge is bit-wise The above algorithm applied with respect to all the edges. Hence all the coverage masks are bit-wise ended for a full coverage test. The full coverage computation optimization should be applied on a per edge basis staring with comparison to 4*Manh (i.e. all 4 quadrants fully covered with respect to that edge) and then apply above algorithms consecutively. In one embodiment, if the edges have positive Lo greater than 4*Manh, the above checks are skipped.

Exemplary logic to perform the edge testing of FIG. 20 is shown in Table 7 below.

TABLE 7

Exemplary logic for Quadrant Based Coverage Testing

```
#define half_width (radius_test_block_width/2)
coverage_code[Q0]=coverage_code[Q1]=coverage_code[Q2]=
coverage_code[Q3]=11;
for all edges{
    sign_vector = cat(sign(Lx), Ly <= 0);
    switch(sign_vector){
        case 00:
            D = CurrentLo + (half_width*Ly); //compute lower
            point's distance
            If (CurrentLo > 0 and D > 0){
                coverage_code[Q0] = & 10;      // fully lit
                coverage_code[Q2] = & 10;      // fully lit
            } else {
                coverage_code[Q0] = & 00;      // partial
                coverage_code[Q2] = & 00;      // partial
            }
        case 01:
            D = CurrentLo − (half_width*Ly); //compute upper
            point's distance
            If (CurrentLo > 0 and D > 0){
                coverage_code[Q0] = & 10;      // fully lit
                coverage_code[Q2] = & 10;      // fully lit
            } else {
                coverage_code[Q0] = & 00;      // partial
                coverage_code[Q2] = & 00;      // partial
            }
        case 10:
            D = CurrentLo + (half_width*Ly); //compute lower
            point's distance
            If (CurrentLo > 0 and D > 0){
                coverage_code[Q1] = & 10;      // fully lit
                coverage_code[Q3] = & 10;      // fully lit
            } else {
                coverage_code[Q0] = & 00;      // partial
                coverage_code[Q2] = & 00;      // partial
            }
        case 11:
            D = CurrentLo − (half_width*Ly); //compute upper
            point's distance
            If (CurrentLo > 0 and D > 0){
                coverage_code[Q1] = & 10;      // fully lit
                coverage_code[Q3] = & 10;      // fully lit
            } else {
                coverage_code[Q0] = & 00;      // partial
                coverage_code[Q2] = & 00;      // partial
            }
    }
}
```

As shown in Table 7 above, different radius test block widths can be supported, providing support for different quadrant sizes based on the radius test block with value.

Figure 21:
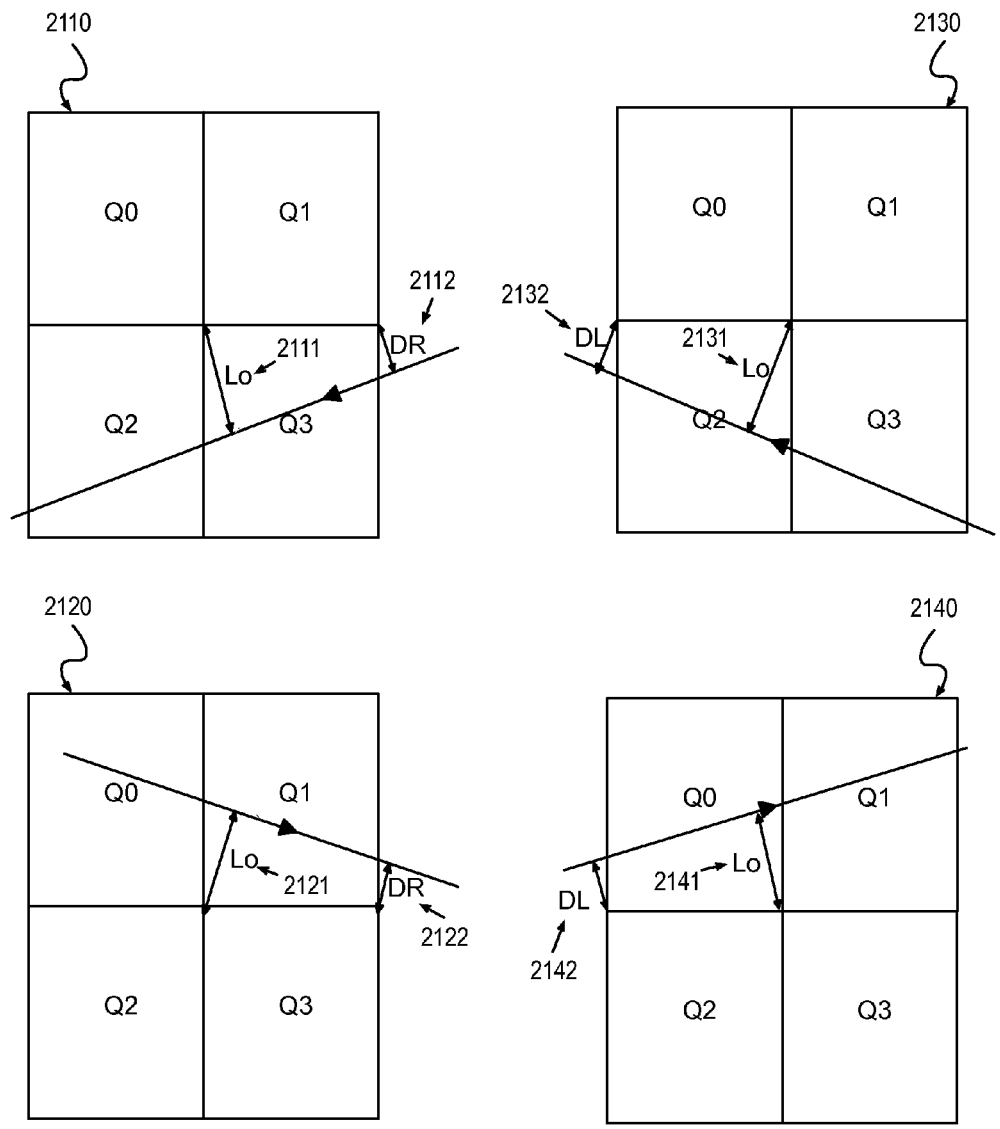
FIG. 21 is an illustration of a quadrant based coverage test applied for each edge, according to an embodiment.

FIG. 21 is an illustration of a quadrant based coverage test 2100 in the orthogonal, direction, according to an embodiment. In one embodiment the quadrant based coverage testing 2100 illustrated is performed for each edge polygon edge to determine quadrant coverage for a 16×16 megaspan block of pixels divided into four 8×8 superspan quadrants. A specific test (e.g., 2110, 2120, 2130, 2140) can be performed for each edge based on the signs of edge coefficients $L_x$ and $L_y$.

In one embodiment, test 2110 is performed where $L_x$ is negative and $L_y$ is negative. A distance R (e.g., DR 2112) is calculated for the edge based an $L_0$ 2111 from a reference point at the center of the four quadrants, where DR=$L_0$+4× $L_y$. If DR 2112 and $L_0$ 2111 are positive, then Q0 and Q1 are fully lit for the edge.

In one embodiment, test 2120 is performed where $L_x$ is negative and $L_y$ is positive. A distance R (e.g., DH 2122) is calculated for the edge based an $L_0$ 2121 from a reference point at the center of the four quadrants, where DR=$L_0$+4× $L_y$. If DR 2122 and $L_0$ 2121 are positive, then Q2 and Q3 are fully lit for the edge.

In one embodiment, test 2130 is performed where $L_x$ is positive and $L_y$ is negative. A distance L (e.g., DL 2132) is calculated for the edge based an $L_0$ 2131 from a reference point at the center of the four quadrants, where DL=$L_0$−4× $L_y$. If DL 2132 and $L_0$ 2131 are positive, then Q0 and Q1 are fully lit for the edge.

In one embodiment, test 2140 is performed where $L_x$ is positive and $L_y$ is positive. A distance L (e.g., DL 2142) is calculated for the edge based an $L_0$ 2141 from a reference point at the center of the four quadrants, where DL=$L_0$−4× $L_y$. If DL 2142 and $L_0$ 2141 are positive, then Q2 and Q3 are fully lit for the edge.

Figure 22:
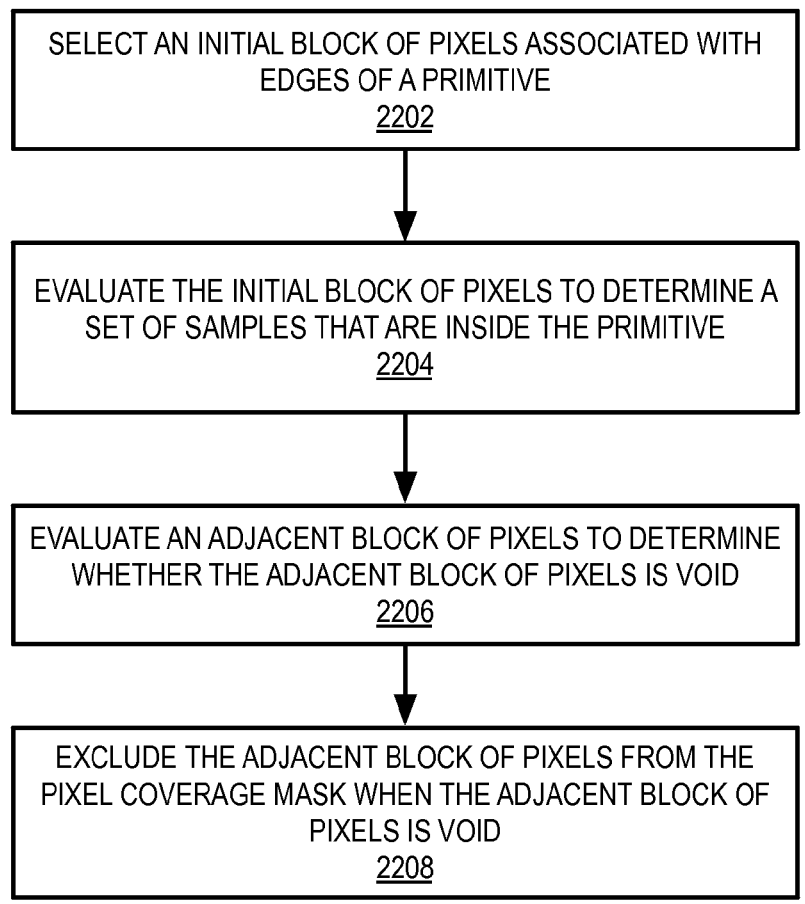
FIG. 22 is a flow diagram of coverage testing logic, according to an embodiment.

FIG. 22 is a flow diagram of coverage testing logic 2200, according to an embodiment. A rasterization engine, such as the rasterization engine 1320 of FIG. 13, can perform the coverage testing logic. One or more rasterization engines can be includes in the render output pipeline 870 of FIG. 8. The coverage testing logic is performed to generate a pixel coverage mask that indicates which pixels within a bounding box are covered by a polygon primitive. In one embodiment, the coverage testing logic 2200 is configured to select an initial block of pixels associated with edges of a primitive, as shown at block 2202. The logic 2200 can evaluate the initial block of pixels to determine a set of samples that are inside of the primitive, as shown at block 2204. In one embodiment, the evaluation of the initial block if pixels is a hierarchical quadrant based coverage test which can quickly determine which quadrants within the initial block of pixels are completely within are completely outside of the primitive.

The logic 2200 can also evaluate an adjacent block of pixels (e.g., in the left, right, or down direction) to determine wither the adjacent block of pixels is void, as shown at block 2206. The evaluation at block 2206, in one embodiment, is performed in parallel with the evaluation at block 2204. The logic 2200 can then exclude the adjacent block of pixels from the pixel coverage map when the adjacent block of pixels are void.

In one embodiment, the logic 2200 illustrated is performed as part of snake walk iteration over a primitive. Based on the evaluation of multiple adjacent blocks in parallel with the evaluation of the current block, the snake walk iteration always walks over valid blocks of pixels and completely avoids wasted clock cycles caused by iterating over void blocks. Additionally, the iteration is performed in a cache coherent manner.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications.

Examples may include subject matter such as a method, means for performing acts of the method, at least one machine-readable medium including instructions that, when performed by a machine cause the machine to performs acts of the method, or of an apparatus or system for facilitating hierarchical quadrant based coverage testing according to embodiments and examples described herein. Various components can be a means for performing the operations or functions described.

One embodiment provides for an apparatus comprising block selection logic to select an initial block of pixels associated with edges of a primitive; and edge determination logic to analyze the initial block of pixels to determine a set of fully covered quadrants of the initial block of pixels and analyze a block of pixels adjacent to the initial block of pixels to determine whether the block of adjacent pixels is void. In a further embodiment the edge determination logic is further to exclude an adjacent block of pixels from a pixel mask in response to a determination that the adjacent block of pixels is void. A further embodiment provides for an apparatus further comprising iterator logic to iterate to an adjacent non-void block of pixels having a boundary that intersects with the edge of the primitive. A further embodiment provides for an apparatus comprising bounding box logic to generate data defining a bounding box that contains the primitive, wherein any sample outside of the bounding box is void. A further embodiment provides for an apparatus wherein the iterator logic is to iterate through one or more blocks of pixels in the bounding box, wherein each iterated block of pixels has a boundary that intersects with an edge of the primitive. A further embodiment provides for an apparatus wherein the edge determination logic is to generate a pixel mask at least in part using a bounding box marker when the bounding box is in the initial block of pixels. A further embodiment provides for an apparatus wherein the iterator logic is further to iterate in a fixed direction across contiguous blocks of non-void screen space. In one embodiment of the apparatus, the edge determination logic is to analyze the initial block of pixels and the block of pixels adjacent to the initial block of pixels in a single clock cycle.

One embodiment provides for a method of determining a pixel coverage mask, the method comprising selecting an initial block of pixels associated with edges of a primitive; evaluating the initial block of pixels to determine a set of samples that are inside the primitive; parallel with evaluating the initial block of pixels, evaluating an adjacent block of pixels to determine whether the adjacent block of pixels is void; and excluding the adjacent block of pixels from the pixel coverage mask when the adjacent block of pixels is void. In a further embodiment, the method additionally comprises determining a bounding box for the primitive defining a rectangle that contains the primitive, wherein any samples outside of the bounding box are void. In on embodiment, the method further comprises determining whether the bounding box enclosing the primitive is within the initial block of pixels and determining the pixel coverage mask using the bounding box.

In one embodiment, evaluating the adjacent block of pixels includes evaluating one or more blocks of pixels in a left, right, and down direction relative to the initial block of pixels. In one embodiment, evaluating the initial block of pixels includes evaluating quadrants of the initial block of pixels. In one embodiment, evaluating the quadrants of the initial block of pixels includes determining which of the quadrants are fully outside of the primitive. In one embodiment, evaluating the quadrants of the initial block of pixels includes determining which of the quadrants are fully inside of the primitive.

In one embodiment, determining which of the quadrants are fully inside of the primitive includes calculating an $L_0$ value to a first reference point and determining a distance value to a second reference point. In one embodiment, the distance value to the second reference point is equal to one of $L_0-4\times L_y$ and $L_0+4\times L_y$. In one embodiment evaluating the adjacent block of pixels includes determining whether an edge of the primitive has an $L_0$ value less than $-8$ times a rectilinear distance to a reference point within the adjacent block of pixels and in response to the determining, excluding the adjacent block of pixels from the pixel coverage mask. In one embodiment, the method additionally comprises, after evaluating the adjacent block of pixels, determining that the adjacent block of pixels has one or more samples inside of the primitive and in response to the determining, selecting the adjacent block of pixels for further evaluation.

One embodiment provides for a non-transitory machine-readable medium storing data which, when read by one or more machines, causes the one or more machines to fabricate one or more integrated circuits to perform a process to determine a pixel coverage mask, the process comprising any of the methods described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
   block selection logic including hardware to select an initial block of pixels and an adjacent block of pixels associated with edges of a primitive for rasterization and to define quadrants of the blocks; and
   edge determination logic including hardware to analyze the initial block to determine if a set of quadrants within the initial block is fully covered by the primitive and to simultaneously analyze the adjacent block to determine whether the adjacent block is not within the primitive, wherein the adjacent block is discarded for rasterization of the primitive if determined not to be within the primitive and wherein the edge determination logic is to analyze the adjacent block to determine if a set of quadrants within the adjacent block is fully covered by the primitive if the adjacent block is determined to be within the primitive after analyzing the initial block.

2. The apparatus of claim 1, wherein the edge determination logic is further to determine that a block that is completely outside of the primitive is void and to exclude an adjacent block from a pixel mask in response to a determination that the adjacent block is void.

3. The apparatus of claim 2, further comprising iterator logic to iterate to an adjacent non-void block of pixels having a boundary that intersects with the edge of the primitive.

4. The apparatus of claim 3, further comprising bounding box logic to generate data defining a bounding box that encloses the primitive, wherein any sample outside of the bounding box is considered void.

5. The apparatus of claim 4, wherein the iterator logic is to iterate through one or more blocks of pixels in the bounding box, wherein each iterated block of pixels has a boundary that intersects with an edge of the primitive.

6. The apparatus of claim 5, wherein the edge determination logic is to generate a pixel mask using the bounding box that encloses the primitive.

7. The apparatus as in claim 5, wherein the iterator logic is further to iterate in a fixed direction across contiguous blocks of non-void screen space.

8. The apparatus as in claim 1, wherein the edge determination logic is to analyze the initial block of pixels and the block of pixels adjacent to the initial block of pixels in a single clock cycle.

9. A method of determining a pixel coverage mask, the method comprising:
selecting an initial block of pixels and an adjacent block of pixels associated with edges of a primitive for rasterization;
evaluating the initial block to determine a set of samples that are inside the primitive;
parallel with evaluating the initial block, evaluating the adjacent block to determine whether the adjacent block is not inside the primitive;
evaluating the adjacent block to determine a set of samples that are inside the primitive when the adjacent block is at least partially inside the primitive; and
excluding the adjacent block of pixels from the pixel coverage mask for rasterization of the primitive when the adjacent block of pixels is not inside the primitive.

10. The method of claim 9, further comprising determining a bounding box defining a rectangle which encloses the primitive, wherein any samples outside of the bounding box are considered void.

11. The method of claim 10, further comprising:
determining whether the initial block of pixels is within the bounding box; and
determining the pixel coverage mask using the bounding box.

12. The method of claim 9, wherein evaluating the adjacent block of pixels includes evaluating one or more blocks of pixels in a left, right, and down direction relative to the initial block of pixels.

13. The method of claim 10, wherein the initial block of pixels includes one or more quadrants and evaluating the quadrants of the initial block of pixels to determine if the set of samples are inside the primitive.

14. The method of claim 13, further comprising evaluating quadrants within the bounding box to determine which quadrants within the bounding box contain samples that are fully outside of the primitive.

15. The method of claim 13, wherein evaluating the quadrants of the initial block of pixels includes determining which of the quadrants are fully inside of the primitive.

16. The method of claim 15, wherein determining which of the quadrants are fully inside of the primitive includes determining a reference point within the initial block and calculating an $L_0$ value as a distance value to the reference point from an edge of the primitive within the initial block.

17. The method of claim 16, wherein the edge of the primitive is designated $L_y$, and the distance value to the reference point is equal to $L_0 + 4 \times L_y$.

18. The method of claim 16, wherein the edge of the primitive is designated $L_y$, and the distance value to the second reference point is equal to $L_0 - 4 \times L_y$.

19. The method of claim 9, wherein evaluating the adjacent block of pixels includes determining whether an edge of the primitive has an $L_0$ value less than −8 times a rectilinear distance to a reference point within the adjacent block of pixels and in response to the determining, excluding the adjacent block of pixels from the pixel coverage mask.

20. The method as in claim 9, wherein after evaluating the adjacent block of pixels, determining that the adjacent block of pixels has one or more samples inside of the primitive and, in response to the determining, selecting the adjacent block of pixels for further evaluation.

21. A non-transitory machine-readable medium storing data which, when read by one or more machines, causes the one or more machines to fabricate one or more integrated circuits to perform a process to determine a pixel coverage mask, the process comprising:
selecting an initial block of pixels and an adjacent block of pixels associated with edges of a primitive for rasterization;
evaluating the initial block to determine a set of samples that are inside the primitive;
parallel with evaluating the initial block, evaluating the adjacent block of to determine whether the adjacent block is not inside the primitive;
evaluating the adjacent block to determine a set of samples that are inside the primitive when the adjacent block is at least partially inside the primitive; and
excluding the adjacent block of pixels from the pixel coverage mask for rasterization of the primitive when the adjacent block of pixels is not inside the primitive.

22. The medium of claim 21, further comprising:
determining a bounding box defining a rectangle which contains the primitive, wherein any samples outside of the primitive are considered void;
determining whether the initial block of pixels is within the bounding box enclosing the primitive; and
determining the pixel coverage mask using the bounding box.

23. The medium of claim 22, wherein:
evaluating the adjacent block of pixels includes evaluating one or more blocks of pixels in a left, right, and down direction relative to the initial block of pixels; and
evaluating the initial block of pixels includes evaluating quadrants of the initial block of pixels.

24. The medium of claim 23, wherein:
evaluating the quadrants of the initial block of pixels includes determining which of the quadrants are fully outside of the primitive and determining which of the quadrants are fully inside of the primitive.

25. The medium of claim 24, wherein determining which of the quadrants are fully inside of the primitive includes determining a first reference point and a second reference point and calculating an $L_0$ value as a distance value to the first reference point and determining a distance value to the second reference point, wherein the distance value to the second reference point is equal to one or more of $L_0 - 4 \times L_y$ and $L_0 + 4 \times L_y$.

* * * * *